(12) United States Patent
Hou et al.

(10) Patent No.: US 10,820,337 B2
(45) Date of Patent: Oct. 27, 2020

(54) DEVICE IN WIRELESS COMMUNICATION SYSTEM, AND WIRELESS COMMUNICATION METHOD

(71) Applicant: SONY CORPORATION, Tokyo (JP)

(72) Inventors: Yanzhao Hou, Beijing (CN); Xiaofeng Tao, Beijing (CN); Yanyan Lu, Beijing (CN); Xin Guo, Beijing (CN); Shiyu Zhang, Beijing (CN); Zhaoqi Peng, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/337,400

(22) PCT Filed: Nov. 2, 2017

(86) PCT No.: PCT/CN2017/109067
§ 371 (c)(1),
(2) Date: Mar. 28, 2019

(87) PCT Pub. No.: WO2018/099237
PCT Pub. Date: Jun. 7, 2018

(65) Prior Publication Data
US 2020/0037341 A1    Jan. 30, 2020

(30) Foreign Application Priority Data
Dec. 2, 2016 (CN) .......................... 2016 1 1101409

(51) Int. Cl.
*H04W 72/12* (2009.01)
*H04W 72/04* (2009.01)
*H04W 72/08* (2009.01)

(52) U.S. Cl.
CPC ..... *H04W 72/1257* (2013.01); *H04W 72/042* (2013.01); *H04W 72/048* (2013.01); *H04W 72/0493* (2013.01); *H04W 72/085* (2013.01)

(58) Field of Classification Search
CPC . H04W 72/02; H04W 72/04; H04W 72/1257; H04W 72/042; H04W 72/048; H04W 72/0493; H04W 72/085
See application file for complete search history.

(56) References Cited

U.S. PATENT DOCUMENTS

2011/0038335 A1    2/2011  Kim et al.
2017/0289733 A1 *  10/2017 Rajagopal ............. H04L 5/0053
(Continued)

FOREIGN PATENT DOCUMENTS

CN      102917455 A     2/2013
CN      104284340 A     1/2015
(Continued)

OTHER PUBLICATIONS

International Search Report dated Jan. 29, 2018 for PCT/CN2017/109067 filed on Nov. 2, 2017, 8 pages including English Translation.
(Continued)

*Primary Examiner* — Candal Elpenord
(74) *Attorney, Agent, or Firm* — Xsensus LLP

(57) ABSTRACT

The present disclosure relates to a device in a wireless communication system, and a wireless communication method. An electronic device in the wireless communication system according to the present disclosure comprises one or more processing circuits. The processing circuits are configured to execute the following operations: monitoring resources corresponding to a first semi-persistent scheduling (SPS) configuration used by the electronic device and resources corresponding to other SPS configurations besides the first SPS configuration; and determining an SPS configuration reselection result of the electronic device according to the monitoring result. By using the device in the wireless communication system and the wireless communication method according to the present disclosure, SPS (Continued)

resources can be reasonably configured so as to reduce the possibility of interference, and a reselection of a SPS configuration can be performed quickly and efficiently when potential interference is found.

17 Claims, 10 Drawing Sheets

(56) References Cited

U.S. PATENT DOCUMENTS

| | | | | |
|---|---|---|---|---|
| 2018/0049193 | A1* | 2/2018 | Belleschi | H04W 72/02 |
| 2019/0090266 | A1* | 3/2019 | Zhao | H04W 72/0446 |
| 2019/0200389 | A1* | 6/2019 | Li | H04W 72/0453 |
| 2019/0223195 | A1* | 7/2019 | Lu | H04W 72/1242 |
| 2019/0253977 | A1* | 8/2019 | Wang | H04W 52/146 |
| 2019/0313375 | A1* | 10/2019 | Loehr | H04W 72/04 |

FOREIGN PATENT DOCUMENTS

| | | |
|---|---|---|
| CN | 106028386 A | 10/2016 |
| WO | 2015/058382 A1 | 4/2015 |

OTHER PUBLICATIONS

NTT DOCOMO et al: "Necessity signaling between eNB and UE for PC5 based V2V", 3GPP Draft; RI-163177 ENB Signaling V2V, 3rd Generation Partnership Project (3GPP), Apr. 2, 2916 (Apr. 2, 2016), XP051080575, Retrieved from the Internet: URL:http://www.3gpp.org/ftp/tsg -ran/WGI -RL 1/TSGRI 84b/Docs/.

Panasonic: "Details on PC5 SPS enhancement", 3GPP Draft; RI-167839, 3rd Generation Partnership Project (3GPP), Aug. 22, 2016-Aug. 26, 2016 Aug. 21, 2016 (Aug. 21, 2016), XP051140826, Retrieved from the internet: URL:http://www.3gpp.org/ftp/Meetings -3GPP - SYNC/RANI/Docs/.

Ericsson: "Mode-1 SPS for V2V over PC5", 3GPP Draft; RI-165272 Mode-1 SPS for V2V Over PC5, 3rd Generation Partnership Project (3GPP), May 23, 2016-May 27, 2016 May 14, 2016 (May 14, 2016), XP051089792, Retrieved from the Internet: URL:http://www.3gpp.org/ftp/tsg ran/WGI-RL1/TSGRI 85/Docs/.

ZTE: "Trigger and release of V2V SPS resources", 3GPP Draft; RI-164963—Trigger and Release of V2V SPS, 3rd Generation Partnership Project (3GPP), May 23, 2016-May 27, 2016 May 13, 2016 (May 13, 2016), XP051096800, Retrieved from the Internet:URL:http://www.3gpp.org/ftp/tsg ran/WGI -RL1/TSGRI 85/Docs/.

Extended European Search Report dated Sep. 20, 2019 in European Application No. 17875856.1.

* cited by examiner

DEVICE IN WIRELESS COMMUNICATION SYSTEM, AND WIRELESS COMMUNICATION METHOD

CROSS-REFERENCE TO RELATED APPLICATIONS

The present application is based on PCT filing PCT/CN2017/109067, filed Nov. 2, 2017, which claims the priority to Chinese Patent Application No. 201611101409.8, titled "DEVICE IN WIRELESS COMMUNICATION SYSTEM, AND WIRELESS COMMUNICATION METHOD", filed with the Chinese Patent Office on Dec. 2, 2016, the entire disclosure of each are incorporated herein by reference.

FIELD

The present disclosure relates to the technical field of wireless communications, and in particular to a user side device and a network side device in a wireless communication system and a wireless communication method in the wireless communication system.

BACKGROUND

Background information related to the present disclosure is provided in this background part, and the background information is not necessarily the conventional technology.

There are two main scheduling methods in the conventional technology, that is, the dynamic scheduling and the semi-persistent scheduling (SPS). In the dynamic scheduling method, it is required to perform a scheduling decision on each subframe, such that the resources are used completely flexibly. However this also increases the signaling overhead. In the SPS method, the network side device provides a scheduling decision for the user side device and an indication indicating that the scheduling decision is to be used every n subframes until the user side device obtains a further notification on a physical downlink control channel (PDCCH). Therefore, control signaling is transmitted only once, thereby reducing overhead. The SPS is a scheduling method in a long term evolution (LTE) system for periodically using resources to save signaling. Generally, the network side device determines the SPS configuration of the user side device and transmits the determined SPS configuration to the user side device, then the user side device may periodically use the same time and frequency resource repeatedly.

In the internet of vehicles, the user side device may be a vehicle. For a vehicle to another device (V2X) service, such as a service between the vehicle and the network side device, the size of the data packet is relatively fixed, and the time interval between the data packets also meet a certain regularity. Therefore, the SPS scheduling method may be used for V2X services to reduce signaling overhead. However, due to the high speed mobility of the vehicles, two nearby vehicles may be interfered with each other when transmitting service data using the same SPS resource. Therefore, it is desirable to reasonably configure the SPS resources to reduce possibility of interference.

Therefore, it is necessary to propose a technical solution to address the above technical issues.

SUMMARY

This summary part provides a general summary of the present disclosure, rather than discloses a full scope or all features thereof.

A user side device and a network side device in a wireless communication system and a wireless communication method are provided, to reasonably configure the SPS resources, to reduce possibility of interference, and the SPS configuration reselection can be performed quickly and efficiently in a case that there is a potential interference.

According to an aspect of the present disclosure, an electronic device in a wireless communication system is provided, which includes one or more processing circuits configured to perform operations of: monitoring resources corresponding to a first semi-persistent scheduling (SPS) configuration used by the electronic device and resources corresponding to other SPS configurations other than the first SPS configuration; and determining an SPS configuration reselection result of the electronic device based on a monitorization result.

According to another aspect of the present disclosure, a network side device in a wireless communication system is provided, which includes one or more processing circuits configured to perform operations of: receiving, from a first user side device within a serving range of the network side device, location information and speed information of the first user side device; and configuring a first SPS configuration for the first user side device based on the location information and speed information.

According to another aspect of the present disclosure, a method performed by an electronic device in a wireless communication system is provided, which includes: monitoring resources corresponding to a first semi-persistent scheduling (SPS) configuration used by the electronic device and resources corresponding to other SPS configurations other than the first SPS configuration; and determining an SPS configuration reselection result of the electronic device based on a monitorization result.

According to another aspect of the present disclosure, a method performed by a network side device in a wireless communication system is provided, which includes: receiving, from a first user side device within a serving range of the network side device, location information and speed information of the first user side device; and configuring a first SPS configuration for the first user side device based on the location information and speed information.

With the electronic device and a wireless communication method in the wireless communication system according to the present disclosure, the electronic device can monitor the resource corresponding to the SPS configuration used by the electronic device and the resources corresponding to other SPS configurations, and can determine the SPS configuration reselection result based on the monitorization result. In this way, the electronic device can reselect the SPS configuration based on the usage of the resources itself, making the usage of the SPS configuration more flexible and reducing interference at the network side device. With the network side device and the wireless communication method in the wireless communication system according to the present disclosure, the network side device can reasonably configure the SPS configuration for the user side device based on the location information and the speed information of the user side device, thereby reducing the possibility of interference at the network side device.

Further applicability regions will become apparent from the description provided herein. The description and specific examples in the summary are only illustrative and are not intended to limit the scope of the present disclosure.

BRIEF DESCRIPTION OF THE DRAWINGS

The drawings are only used for illustrating the selected embodiments rather than all possible implementations, and are not intended to limit the scope of the present disclosure. In the drawings.

Figure 1:
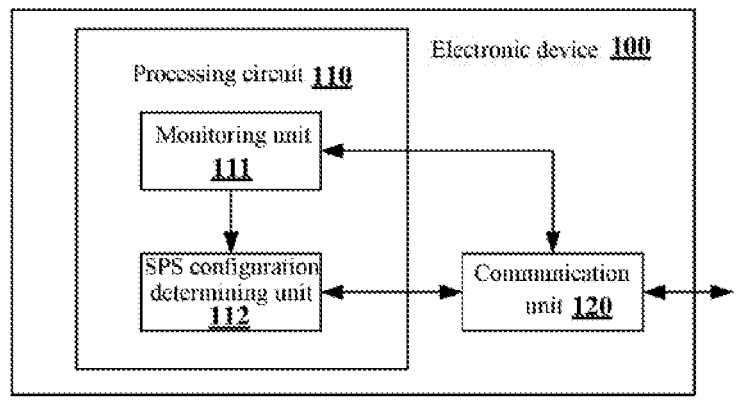
FIG. 1 is a structural block diagram of an electronic device in a wireless communication system according to an embodiment of the present disclosure.

Although various modification and alternations are easily made onto the present disclosure, the specific embodiments are shown in the drawings as an example, and are described in detail here. It should be understood that description for the specific embodiments is not intended to limit the present disclosure into a disclosed specific form, and the present disclosure aims to cover all modification, equivalents and alternations within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that, the exemplary embodiments may be implemented in many different forms without the specific details, and hence all of them should not be construed as limiting the scope of the present disclosure. In some exemplary embodiments, processes, structures and technologies, which are well known, are not described in detail.

The electronic device and the user side device involved in the present disclosure may be a user equipment (UE). A UE involved in the present disclosure includes but not limited to a terminal having a wireless communication function such as a mobile terminal, a computer or a vehicle device. Further, depending on the described functions, the UE involved in the present disclosure may be the UE itself or components in the UE such as a chip. In addition, similarly, the network side device involved in the present disclosure may be a base station, such as eNB or a component in the eNB such as a chip. Thus, the technical solution according to the present disclosure may be applied to a frequency division duplexing (FDD) system and a time division duplexing (TDD) system.

The interference in the present disclosure mainly includes interference to which the network side device is subjected in receiving uplink data. For example, when one user side device A is transmitting an uplink service to a network side device using a resource a, there is a user side device B (or multiple user side devices) that is close to the user side device A, thus the user side device A and the user side device B have a same or similar channel condition, and the user side device B is transmitting a service to another user side device or the network side device using the resource a. In this case, the network side device may receive data from the user side device A and data from the user side device B. The network side device may not correctly demodulate the data from the two user side devices under a certain condition, thereby causing interference. According to the present disclosure, it is desired to reasonably configure and reselect the SPS configuration, to minimize such interference.

First Embodiment

FIG. 1 is a structural block diagram of an electronic device 100 in a wireless communication system according to an embodiment of the present disclosure. Here, the electronic device 100 may be a user side device in a wireless communication system.

As shown in FIG. 1, the electronic device 100 in a wireless communication system may include a processing circuit 110. It is to be noted that the electronic device 100 may include one processing circuit 110, or may include multiple processing circuits 110.

Further, the processing circuit 110 may include various types of discrete functional units to perform different functions and/or operations. It should be noted that, the functional units may be physical entities or logic entities, and units with different names may be implemented by a same physical entity.

According to an embodiment of the present disclosure, the processing circuit 110 may include a monitoring unit 111 and an SPS configuration determining unit 112.

According to an embodiment of the present disclosure, the monitoring unit 111 may monitor resources corresponding to the first SPS configuration used by the electronic device and resources corresponding to other SPS configurations other than the first SPS configuration.

According to an embodiment of the present disclosure, the first SPS configuration is an SPS configuration currently used by the electronic device 100, and the other SPS configurations may be SPS configurations different from the first SPS configuration, and the other SPS configurations may include one or more SPS configurations. The configuration information for a SPS configuration may include all resources corresponding to the SPS configuration and the period of the SPS configuration. Here, the monitoring unit 111 may monitor all resources corresponding to the first SPS configuration and other SPS configurations. Further, the monitoring unit 111 may transmit the monitorzation result to the SPS configuration determining unit 112.

According to an embodiment of the present disclosure, the SPS configuration determining unit 112 may determine an SPS configuration reselection result of the electronic device 100 according to the monitorization result.

According to an embodiment of the present disclosure, the SPS configuration determining unit 112 may acquire a monitoration result to resources corresponding to the first SPS configuration and other SPS configurations from the monitoring unit 111, and may determine an SPS configuration reselection result. Here, the SPS configuration reselection result may include decision information on SPS configuration reselection, for example, whether to reselect the first SPS configuration that the electronic device 100 is using, to reselect from the first SPS configuration to which SPS configuration, whether it is required to transmit an SPS configuration switching request to the network side device and the like.

It can be seen that, the electronic device 100 according to the present disclosure may monitor the resources corresponding to the SPS configuration being used and the resources corresponding to other SPS configurations, to determine the SPS configuration reselection result. In this way, the electronic device 100 can reselect the SPS configuration based on the usage of the resources, thereby making the usage of the SPS configuration more flexible and reducing interference at the network side device.

According to an embodiment of the present disclosure, the electronic device 100 may further include a communication unit 120 as a transceiver and so on. The electronic device 100 may communicate with other devices through the communication unit 120, to transmit information and receive information and the like.

According to an embodiment of the present disclosure, the wireless communication system may be a vehicle networked system, and the electronic device 100 in the wireless communication system may be an in-vehicle device.

According to an embodiment of the present disclosure, the monitoring unit 111 in the processing circuit 110 may be further configured to perform an operation of: monitoring received signal strength on the resources corresponding to the first SPS configuration and the resources corresponding to the other SPS configurations.

Here, the received signal strength may be represented by various parameters, such as received signal strength indicator (RSSI). The received signal strength on a particular resource reflects to some extent the number of users using the resource and locations of the users. For example, in a case that the received signal strength on a particular resource is large, it indicates that the number of users using the resource is large, or the user using the resource is close to the electronic device 100.

According to an embodiment of the present disclosure, the monitoring unit 111 in the processing circuit 110 may be configured to perform an operation of periodically recording received signal strength on the resources corresponding to the first SPS configuration and the resources corresponding to the other SPS configurations.

Figure 2:
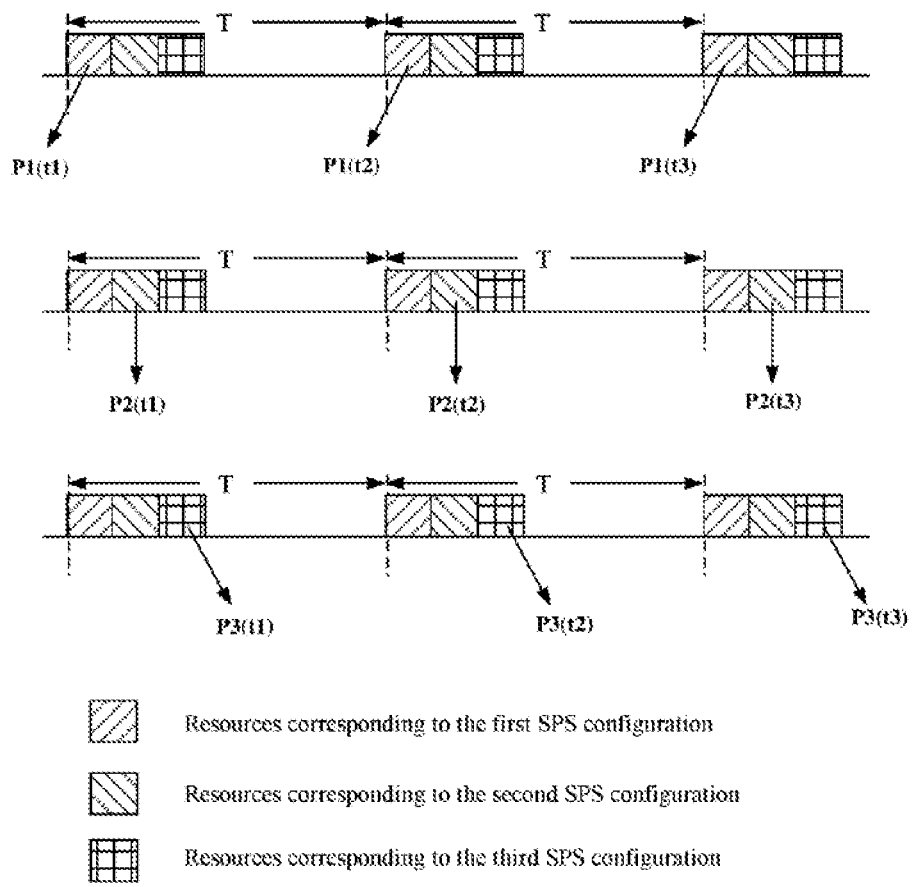
FIG. 2 is a schematic diagram of monitoration to recourses by an electric device according to an embodiment of the present disclosure.

FIG. 2 is a schematic diagram of monitoring to recourses by the electric device 100 according to an embodiment of the present disclosure. As shown in FIG. 2, the horizontal axis represents a time, and the electronic device 100 records the received signal strength on the resources corresponding to the first SPS configuration and other SPS configurations in a time period T. The figure in the upper part shows a schematic diagram of recording the received signal strength on the resource corresponding to the first SPS configuration, and P1(t1) represents the received signal strength on the resource corresponding to the first SPS configuration at time t1, P1(t2) represents the received signal strength on the resource corresponding to the first SPS configuration at time t2, and P1(t3) represents the received signal strength on the resource corresponding to the first SPS configuration at time t3. The figure in the middle part shows a schematic diagram of recording the received signal strength on the resource corresponding to the second SPS configuration, and P2(t1) represents the received signal strength on the resource corresponding to the second SPS configuration at time t1, P2(t2) represents the received signal strength corresponding to the second SPS configuration at time t2, and P2(t3) represents the received signal strength corresponding to the second SPS configuration at time t3. The figure in the lower part shows a schematic diagram of recording the received signal strength on the resource corresponding to the third SPS configuration, P3 (t1) represents the received signal strength on the resource corresponding to the third SPS configuration at time t1, P3(t2) represents the received signal strength on the resource corresponding to the third SPS configuration at time t2, and P3(t3) represents the received signal strength on the resource corresponding to the third SPS configuration at time t3. It is to be noted that, FIG. 2 shows a case where the other SPS configurations includes the second SPS configuration and the third SPS configuration. The other SPS configurations may also include more SPS configurations. In addition, FIG. 2 shows a case where the received signal strength on the resource corresponding to each SPS configuration is recorded for three times. The received signal strength on the resource corresponding to each SPS configuration may be recorded for more times. In the case where the received signal strength on the resource corresponding to each SPS configuration is recorded for three times, for example, only the latest three records are stored, and in a case where there is a new record, the oldest record may be deleted to ensure that only the latest three records are stored. Table 1 shows an example of storing the received signal strength.

TABLE 1

|  | Time t1 | Time t2 | Time t3 |
|---|---|---|---|
| First SPS configuration | P1(t1) | P1(t2) | P1(t3) |
| Second SPS configuration | P2(t1) | P2(t2) | P2(t3) |
| Third SPS configuration | P3(t1) | P3(t2) | P3(t3) |

According to an embodiment of the present disclosure, the SPS configuration determining unit 112 in the processing circuit 110 may be further configured to perform an operation of: reselecting the SPS configuration of the electronic device to one of one or more SPS configurations among the other SPS configurations, in a case that the received signal strength on the resources corresponding to the first SPS configuration gradually increases and the received signal strength on the resources corresponding to the one or more SPS configurations gradually decreases.

As described above, in a case that the received signal strength on the resource corresponding to the first SPS configuration gradually increases, for example, P1(t1)≤P1(t2)<P1(t3), it is indicated that the number of users using the resource is large, or the user using the resource is close to the electronic device 100. That is, the gradual increase of the received signal strength on the resource corresponding to the first SPS configuration indicates a high possibility that there is another user side device using the same resource as the electronic device 100 and close to the electronic device 100. That is, there is also a high possibility of interference at the network side device. In this case, the SPS configuration determining unit 112 may determine that it is required to reselect the SPS configuration for the electronic device 100.

Similarly, in a case that received signal strength on the resources corresponding to one or more SPS configurations in the other SPS configurations, such as the second SPS configuration in FIG. 2, gradually decreases, for example, P2(t1)>P2(t2)>P2(t3), it is indicated that the number of users using the resource is small, or the user using the resource is far from the electronic device 100. Thus, the SPS configuration determining unit 112 may determine to reselect the SPS configuration of the electronic device 100 from the first SPS configuration to one of the one or more SPS configurations.

In addition, the SPS configuration determining unit 112 in the processing circuit 110 may further set a threshold for the received signal strength on the resources corresponding to the first SPS configuration, and perform the above operation only when the received signal strength exceeds the set threshold. That is, in a case that the received signal strength on the resources corresponding to the first SPS configuration gradually increases, the (currently, that is, newly recorded) received signal strength exceeds the received signal strength threshold, and the received signal strength on the resources corresponding to one or more of the other SPS configurations gradually decreases, the SPS configuration of the electronic device 100 is reselected to one of the one or more SPS configurations.

According to an embodiment of the present disclosure, the SPS configuration determining unit 112 may select a SPS configuration from the one or more SPS configurations described above according to various criteria. For example, in an embodiment, the SPS configuration determining unit 112 may randomly select a SPS configuration in one or more SPS configurations and reselect the SPS configuration of electronic device 100 from the first SPS configuration to the SPS configuration. In another embodiment, a SPS configuration with the highest average received signal strength change rate is selected from one or more SPS configurations, and the SPS configuration of the electronic device 100 is reselected from the first SPS configuration to the SPS configuration with the highest average received signal strength change rate.

It can be seen that, according to an embodiment of the present disclosure, in a case that there is a high possibility of interference in the SPS configuration used by the electronic device 100, the SPS configuration determining unit 112 may reselect the SPS configuration of the electronic device 100 to a SPS configuration with a lower possibility of interference, thereby avoiding potential interference at the network side device. Further, the electronic device 100 may determine the SPS configuration to be used itself, such that the SPS configuration is configured more flexibly.

Figure 3:
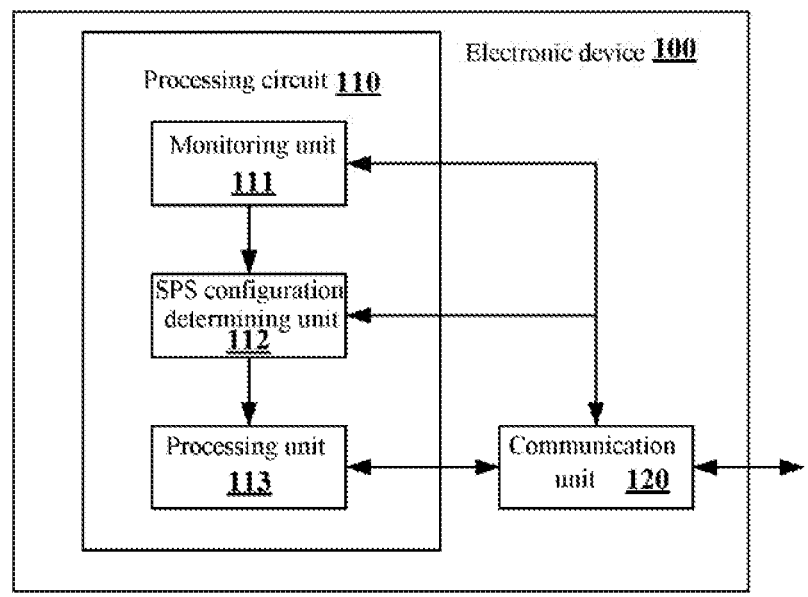
FIG. 3 is a structural block diagram of an electronic device in a wireless communication system according to another embodiment of the present disclosure.

FIG. 3 is a structural block diagram of an electronic device 100 in a wireless communication system according to another embodiment of the present disclosure.

As shown in FIG. 3, the processing circuit 110 of the electronic device 100 may include a monitoring unit 111, a SPS configuration determining unit 112 and a processing unit 113. The monitoring unit 111 and the SPS configuration determining unit 112 herein are described above, and are not described herein again.

According to an embodiment of the present disclosure, the processing unit 113 may transmit the reselected SPS configuration to a network side device for serving the electronic device 100, for example, through the communication unit 120. Here, the electronic device 100 is located within the coverage of the network side device for serving the electronic device 100. After the SPS configuration determining unit 112 determines the reselected SPS configuration, the reselected SPS configuration may be transmitted to the processing unit 113, and the reselected SPS configuration is transmitted by the processing unit 113 to the network side device through the communication unit 120. In this way, the network side device may obtain the SPS configurations for all user side devices within its serving range, Which is convenient for management.

According to an embodiment of the present disclosure, the processing unit 113 may further transmit a service to the network side device based on the reselected SPS configuration, for example, through the communication unit 120. The service here may be a data service.

According to an embodiment of the present disclosure, the reselected. SPS configuration may be transmitted separately from the service. For example, the electronic device 100 transmits the reselected SPS configuration to the network side device through the communication unit 120, and transmits the service to the network side device through the communication unit 120 later.

According to an embodiment of the present disclosure, the reselected SPS configuration may be transmitted with the service. For example, the electronic device 100 may transmit a service to the network side device using the reselected SPS configuration through the communication unit 120, and notify the network side device of the reselected SPS configuration at the same time.

It can be seen that, according to an embodiment of the present disclosure, the SPS configuration reselection result of the electronic device 100 may be determined based on the monitorization result of the monitoring unit 111. Specifically, the SPS configuration reselection result of the electronic device 100 may include: reselecting the SPS configuration of the electronic device and reselecting the SPS configuration of the electronic device from, the first SPS configuration to one of the other SPS configurations. However, there may be no SPS configuration in the other SPS configurations in which the received signal strength on the corresponding resources gradually decreases. That is, there is no suitable SPS configuration for reselection in the other SPS configurations. The operation of the electronic device 100 in this case is described in detail below.

According to an embodiment of the present disclosure, the SPS configuration determining unit 112 in the processing circuit 110 is further configured to perform an operation of determining an SPS configuration reselection result of the electronic device 100 based on link quality between the electronic device 100 and the network side device for serving the electronic device 100, in a case that the received signal strength on the resources corresponding to the first SPS configuration gradually increases and there is no other SPS configuration in which received signal strength on corresponding resources gradually decreases.

According to an embodiment of the present disclosure, the received signal strength on the resources corresponding to the first SPS configuration gradually increases, and there is no other SPS configuration in which the received signal strength on the corresponding resources gradually decreases, it indicates a high possibility of interference at the first SPS configuration currently used by the electronic device 100, and no other SPS configurations with a low possibility of interference for reselection. In this case, the electronic device 100 (for example, a measuring unit which is not shown) may measure the link quality between the electronic device 100 and the network side device, and determine an SPS configuration reselection result based on the link quality.

According to an embodiment of the present disclosure, the link quality may be indicated by one or more of a signal to interference ratio (SIR), a signal to interference plus noise ratio (SINR), or a signal noise ratio (SNR), which is not limited in the disclosure.

Similarly, the SPS configuration determining unit 112 in the processing circuit 110 may set a received signal strength threshold which may be the same as the above received signal strength threshold. Only in a case that the received signal strength on the resources corresponding to the first SPS configuration gradually increases, the (currently, that is, newly recorded) received signal strength exceeds the received signal strength threshold, and there is no other SPS configuration in which the received, signal strength on the corresponding resources gradually decreases, the above operation is performed.

According to an embodiment of the present disclosure, the SPS configuration determining unit 112 in the processing circuit 110 may be further configured to perform an operation of: transmitting an SPS configuration reselection request to the network side device, for example, through the communication unit 120, in a case that the link quality between the electronic device 100 and the network side device is less than a first threshold.

According to an embodiment of the present disclosure, in a case that the link quality parameter between the electronic device 100 and the network side device is small, it indicates that the link quality between the electronic device 100 and the network side device is poor, and it is likely that the network side device is interfered by another user side device, and the electronic device 100 cannot find another suitable SPS configuration for reselection. In this ease, the electronic device 100 may transmit an SPS configuration reselection request to the network side device to request the network side device to reselect a SPS configuration.

In general, since the number of SPS configurations that the user side device can monitor is limited, and the SPS configuration that the network side device can measure is relatively comprehensive, in a case that it is required to reselect the SPS configuration for the electronic device 100, the SPS configuration reselection request may be transmitted to the network side device, thereby increasing the likelihood of reselecting the SPS configuration, thus reducing interference at the network side device. That is, the SPS configuration reselection result of the electronic device 100 determined by the SPS configuration determining unit 112 includes: reselecting the SPS configuration of the electronic device 100 and transmitting an SPS configuration reselection request to the network side device.

According to an embodiment of the present disclosure, the SPS configuration determining unit 112 in the processing circuit 110 is further configured to perform an operation of performing no SPS configuration reselection of the electronic device in a case that the link quality between the electronic device 100 and the network side device is greater than or equal to the first threshold.

According to an embodiment of the present disclosure, in a case that the link quality parameter between the electronic device 100 and the network side device is high, it indicates that the link quality between the electronic device 100 and the network side device is good, and it is likely that the network side device is not interfered by other users. In, this case, the reselection of the SPS configuration may not be performed. That is, the first SPS configuration is used continually.

It can be seen that the electronic device 100 needs to determine the reselection result in combination with the resource monitorization result and the link quality. That is, the SPS configuration reselection result of the electronic device 100 determined by the SPS configuration determining unit 112 includes: perform no SPS configuration reselection.

As described above, according to an embodiment of the present disclosure, when the electronic device 100 is performing communication with the network side device using a certain SPS configuration, the SPS configuration and other SPS configurations may be monitored, and the SPS configuration reselection result is determined based on the monitorization result. Such a process may be applied to any stage of communication between the electronic device 100 and the network side device. For example, a stage in which the SPS configuration of the electronic device 100 is initially configured or an intermediate stage in which the electronic device 100 is performing communication with the network side device. The operation according to the present disclosure may be performed as long as the electronic device 100 is using a SPS configuration. Further, the first SPS configuration being used by the electronic device 100 may be configured by the network side device, or may be an SPS configuration determined by (for example, the SPS configuration determining unit 112 of) the electronic device 100 itself.

According to an embodiment of the present disclosure, the processing circuit 110 is further configured to perform an operation of receiving a first SPS configuration from a network side device for serving the electronic device 100 through the communication unit 120. In a case where the first SPS configuration is configured by the network side device, the electronic device 100 may receive the first SPS configuration from the network side device, and transmit a service to the network side device using the first SPS configuration.

According to an embodiment of the present disclosure, the network side device may configure the SPS configuration of the electronic device 100 according to certain criteria. For example, the processing circuit 110 of the electronic device 100 is further configured to perform the operation of: first transmitting, to the network side device, location information and speed information of the electronic device and priority information of a service transmitted to the network side, device through the communication unit 120.

Here, the information on the corresponding relationship between different services and priorities may be specified in advance at the network side and the user side. The priority of the service may be, for example, classified into multiple levels. Before the electronic device 100 transmits the service to the network side device, the electronic device 100 may determine the priority information of a service according to the service to be transmitted. In addition, the electronic device 100 may periodically report the above information, or may report the above information by an event trigger. According to an embodiment of the present disclosure, the network side device may determine the first SPS configuration information to be used by the electronic device 100 and notify the electronic device 100, based on the location information, the speed information and the priority information of the service transmitted to the network side device by the electronic device 100.

According to an embodiment of the present disclosure, the processing circuit 110 may be further configured to perform the operation of: selecting a first SPS configuration from a resource pool. Here, the first SPS configuration may be selected based on the functions of the monitoring unit 111 and the SPS configuration determining unit 112 described above. That is, in a case that the first SPS configuration is selected by the electronic device 100 itself, the first SPS configuration may be an SPS configuration determined based on the monitorization result after monitoring to resources corresponding to multiple SPS configurations.

In other words, no matter whether the SPS configuration currently used by the electronic device 100 is configured by the network side device or determined by the electronic device 100 itself, the electronic device 100 can monitor the SPS configuration being used and other SPS configurations, and determines the SPS configuration reselection result based on the monitorization result.

According to an embodiment of the present disclosure, in a case that the network side device configures an initial SPS configuration for the electronic device 100, the network side device may transmit the initial SPS configuration to the electronic device 100 through downlink control information (DCI). The DCI format includes format 0, format 1, . . . , format 6. The format 0 indicates the configuration of resources in a cell, thus DCI format 0 is generally used to transmit the SPS configuration to the electronic device 100. For example, in a case that the SPS configuration is indicated using three bits in the DCI format 0, 8 different DCI formats may be generated. Since the SPS shares the resources with the traditional resource pools, all the resource blocks corresponding to the SPS configuration in the same cell belong to the resource pool. According to an embodiment of the present disclosure, in order to allow the user side device to have more selection, a one-to-many mapping relationship between each DCI format and the SPS configurations are adopted. For example, multiple (for example, three) SPS configurations may be included under a DCI format.

According to an embodiment of the present disclosure, the other SPS configurations may include SPS configurations other than the first SPS configuration in all SPS configurations belonging to all DCI formats.

According to an embodiment of the present disclosure, the other SPS configurations may also include all other SPS configurations belonging to the same DCI format as the first SPS configuration. That is, the other SPS configurations belong to the same DCI format as the first SPS configuration. In this case, the electronic device 100 may only be reselected to one of the other SPS configurations. That is, the electronic device 100 can only monitor these SPS configurations in the same DCI format as the currently used SPS configuration, and can only reselect to these SPS configurations belonging to the same DCI format as the currently used SPS configuration. In this way, the monitoring range of the electronic device 100 can be greatly reduced.

Figure 4:
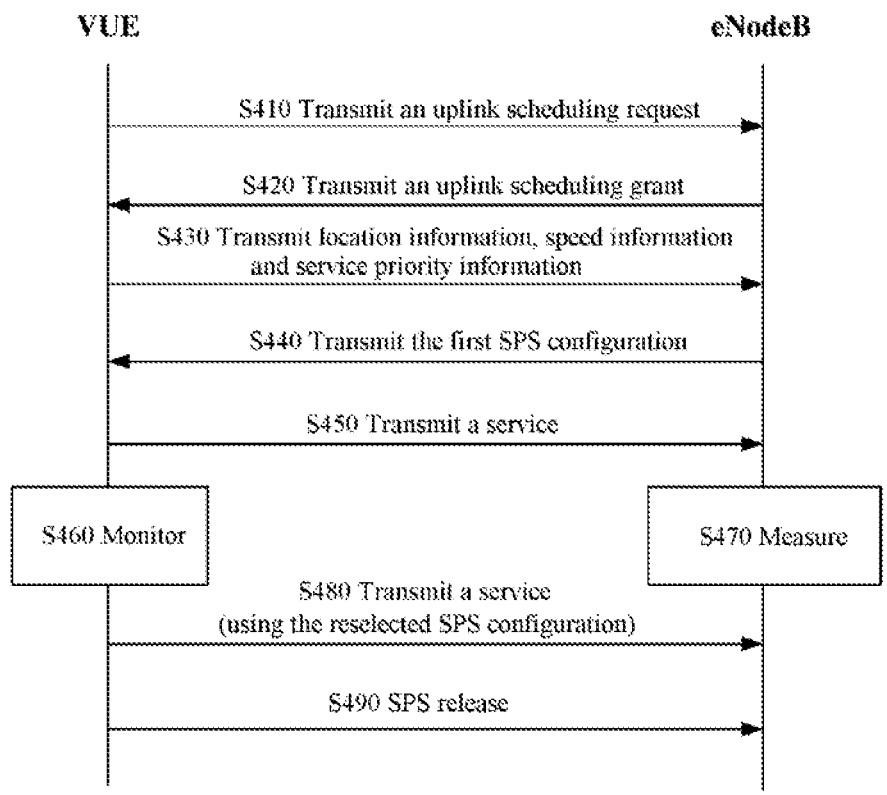
FIG. 4 is a signaling flowchart of a SPS configuration reselection for an electric device according to an embodiment of the present disclosure.

FIG. 4 is a signaling flowchart of a SPS configuration reselection for an electric device 100 according to an embodiment of the present disclosure.

As shown in FIG. 4, the VUE represents the electronic device 100 described above, and the eNodeB represents the network side device described above. In step S410, the VUE transmits an uplink scheduling request to the eNodeB. Next, in step S420, the eNodeB transmits an uplink scheduling grant to the VUE. Next, in step S430, the VUE reports location information, speed information and service priority information to the eNodeB. Next, in step S440, the eNodeB determines the SPS configuration of the VUE and informs the VUE of the SPS configuration, which is, for example, the first SPS configuration described above. Next, in step S450, the VUE transmits the service to the eNodeB using the first SPS configuration. In step S460, the VUE monitors the first SPS configuration and the other SPS configurations. If the SPS configuration reselection is not triggered, the VUE transmits the service to the eNodeB continually using the first SPS configuration. In addition, in step S470, the eNodeB may measure all SPS configurations. In a case that the SPS configuration reselection is triggered at the VUE side, in step S480, the VUE determines the reselected SPS configuration, and continues to transmit service to the eNodeB using the reselected SPS configuration until the SPS process is released in step S490.

It is to be noted that FIG. 4 only shows the case where the first SPS configuration is set by the eNodeB as the network side device, and the case where the VUE as the electronic device 100 finds an SPS configuration suitable for reselection. However, FIG. 4 is merely exemplary, the VUE may not find an SPS configuration suitable for reselection, and the first SPS configuration may also be determined by the VUE as the electronic device 100. For example, the electronic device configures the reselected SPS configuration as the "first SPS configuration" and continues to monitor the SPS configurations other than the reselected SPS configuration.

The electronic device 100 according to the embodiment of the present disclosure is described in detail above. According to the electronic device 100 of the present disclosure, the resources corresponding to the SPS configuration being used and the resources corresponding to other SPS configurations may be monitored to determine the SPS configuration reselection result. For example, the SPS configuration being used is reselected to other SPS configurations, the SPS configuration is used continually, or an SPS configuration reselection request is transmitted to the network side device. In this way the electronic device 100 can reselect the SPS configuration based on the usage of the resources, thereby making the usage of the SPS configuration more flexible and reducing interference at the network side device.

Second Embodiment

Figure 5:
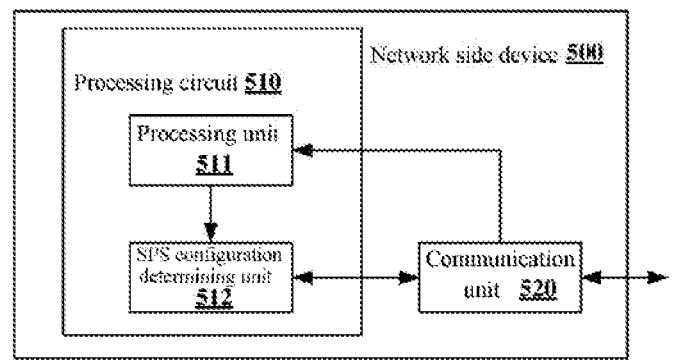
FIG. 5 is a structural block diagram of a network side device in a wireless communication system according to an embodiment of the present disclosure.

Hereinafter, the network side device 500 according to an embodiment of the present disclosure is described in detail. FIG. 5 is a structural block diagram of a network side device in a wireless communication system according to an embodiment of the present disclosure.

As shown in FIG. 5, the network side device 500 in a wireless communication system may include a processing circuit 510. It is to be noted that the network side device 500 may include one processing circuit 510 or multiple processing circuits 510.

Furthermore, the processing circuit 510 may include separate functional units to perform different functions and/or operations. It should be noted that, the functional units may be physical entities or logical entities, and units with different names may be implemented by a same physical entity.

In addition, the network side device 500 may include a communication unit 520 as a transceiver and so on. The network side device 500 may perform communication with other devices through the communication unit 520, such as receiving information and transmitting information and the like.

According to an embodiment of the present disclosure, the processing circuit 510 may include a processing unit 511 and an SPS configuration determining unit 512.

According to an embodiment of the present disclosure, the processing unit 511 may receive location information and speed information of the first user side device from the first user side device within the serving range of the network side device 500. For example, the processing unit 511 may receive location information and speed information from the first user side device through the communication unit 520, and may store the location information and the speed information. Next, the processing unit 511 may transmit the location information and the speed information of the user side device to the SPS configuration determining unit 512.

According to an embodiment of the present disclosure, the SPS configuration determining unit 512 may configure the first SPS configuration for the first user side device based on the location information and die speed information. Here, the SPS configuration determining unit 512 may receive the location information and the speed information of the first user side device from the processing unit 511, and may transmit the configured first SPS configuration to the first user side device through the communication unit 520.

Here, the first user side device may be any user side device within the serving range of the network side device 500, and may be, for example, the electronic device 100 in FIGS. 1 and 3. That is, the network side device 500 may receive location information and speed information from any user side device within its serving range, and configure the SPS configuration for the user side device.

It can be seen that, according to the network side device 500 of the present disclosure, the SPS configuration may be set for the user side device based on the location information and the speed information of the user side device, thereby setting the SPS configuration of each user side device more reasonably, and reducing the possibility of interference. The network side device 500 may set multiple or multiple kinds of SPS configurations for the user side device.

According to an embodiment of the present disclosure, the wireless communication system may be a vehicle networked system, and the user side device in the wireless communication system may be an in-vehicle device, and the network side device 500 may be a device such as a base station for serving the user side device.

According to an embodiment of the present disclosure, the SPS configuration determining unit 512 of the processing circuit 510 may be further configured to perform an operation of: predicting location information of the first user side device within a predetermined time period based on the location information and the speed information; and configuring the first SPS configuration for the first user side device based on the location information of the first user side device in the predetermined time period. The first SPS configuration includes resources that the first user side device may use or allocate at different locations.

After the location information and the speed information of the first user side device are acquired by the SPS configuration determining unit 512 as described above, the location of the first user side device within a predetermined time period may be predicted. According to an embodiment of the present disclosure, the predetermined time period may include one or more time points, and the SPS configuration determining unit 512 may predict one or more locations of the first user side device at the one or more time points. According to an embodiment of the present disclosure, the predetermined time period may be a period of the SPS configuration, for example, 10 seconds. In the case where the predetermined time period is 10 seconds, for example, the predetermined time period includes two time points of the fifth second and the tenth second, the SPS configuration determining unit 512 may predict a first position of the user side device at the fifth second and a second position of the user side device at the tenth second.

Next, the SPS configuration determining unit 512 may configure the first SPS configuration for the first user side device based on the predicted location information of the first user side device within a predetermined time period, such that the first user side device use a different SPS configuration from that of other user side device adjacent thereto. Here, it may be defined that the adjacent user side device is a user side device located within a distance from the first user side device less than a threshold.

According to an embodiment of the present disclosure, the SPS configuration determining unit 512 in the processing circuit 510 is further configured to perform an operation of: predicting location information of other user side devices other than first user side device in the predetermined time period; and configuring the first SPS configuration for the first user side device based on the location information of the first user side device within a predetermined time period and the location information of the other user side devices within a predetermined time period.

Here, the other user side devices may include user side devices within the serving range of the network side device 500 and user side devices outside the serving range of the network side device 500. For the user side devices in the serving range of the network side device 500, the network side device 500 may acquire location information and speed information of other user side devices in a manner similar to the first user side device, thereby predicting location information of other user side devices in a predetermined time period. For the user side devices outside the serving range of the network side device 500, the network side device 500 may acquire location information and speed information of the user side device from other network side devices for serving the user side devices (for example, through an X2 interface), thereby predicting location information of the user side devices within a predetermined time period. That is, different network side devices may share the location information and speed information of the user side devices in the respective serving ranges through the X2 interface.

According to an embodiment of the present disclosure, other user side devices may be determined based on the location information and the speed information of the first user side device. For example, the other user side devices may include all user side devices around the motion trajectory of the first user side device, that is, all user side devices within a certain range around the motion trajectory of the first user side device for a predetermined time period. Such other user side devices may be adjacent user side devices of the first user side device at a certain time in the predetermined time period, thereby causing interference to the service data transmitted by the first user side device to the network side device 500.

According to an embodiment of the present disclosure, the SPS configuration determining unit 512 in the processing circuit 510 is further configured to perform an operation of configuring the first SPS configuration for the first user side device such that the first SPS configuration belongs to a DCI format different from that of the other user side devices within the serving range of the network side device 500.

It is mentioned in the first embodiment that DCI format 0 may be used to transmit an SPS configuration to a user side device, and multiple (for example, three) SPS configurations may be included under one DCI format. Here, different user side devices within the serving range of the same network side device may be configured with different DCI formats to further reduce the possibility of interference.

Figure 6:
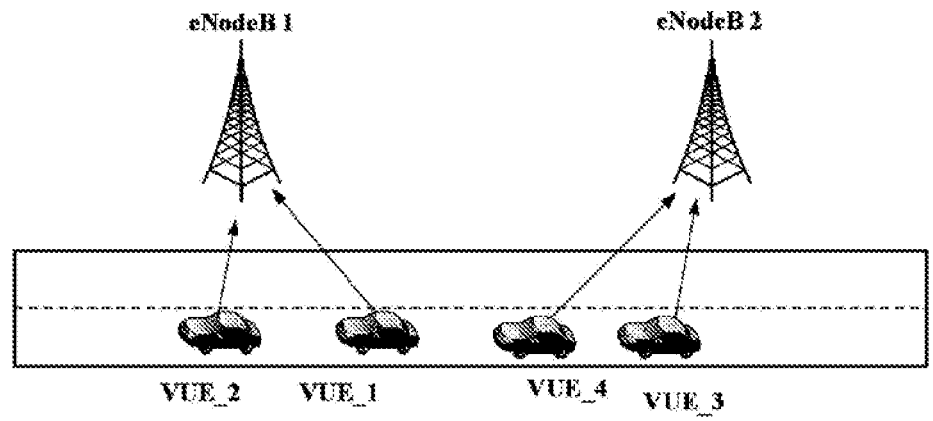
FIG. 6 is a schematic diagram of a scenario in which a network side device configures an SPS configuration for a user side device according to an embodiment of the present disclosure.
Figure 7:
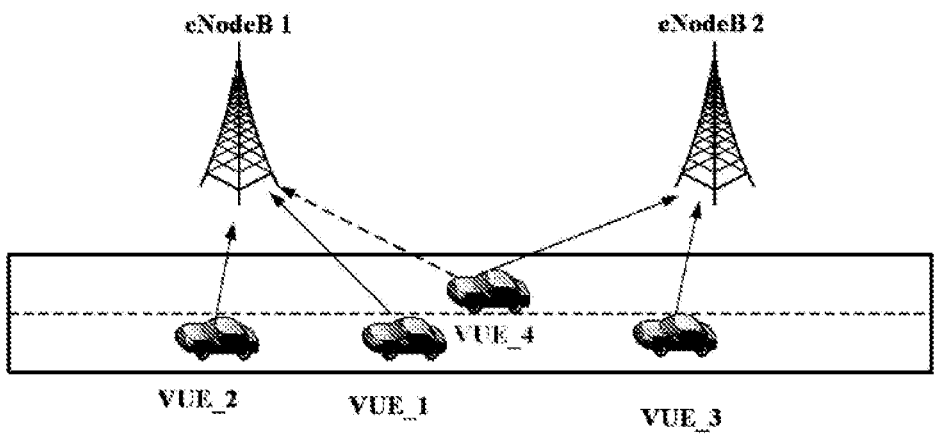
FIG. 7 is a schematic diagram of a scenario in which a network side device configures an SPS configuration for a user side device according to another embodiment of the present disclosure.
Figure 8:
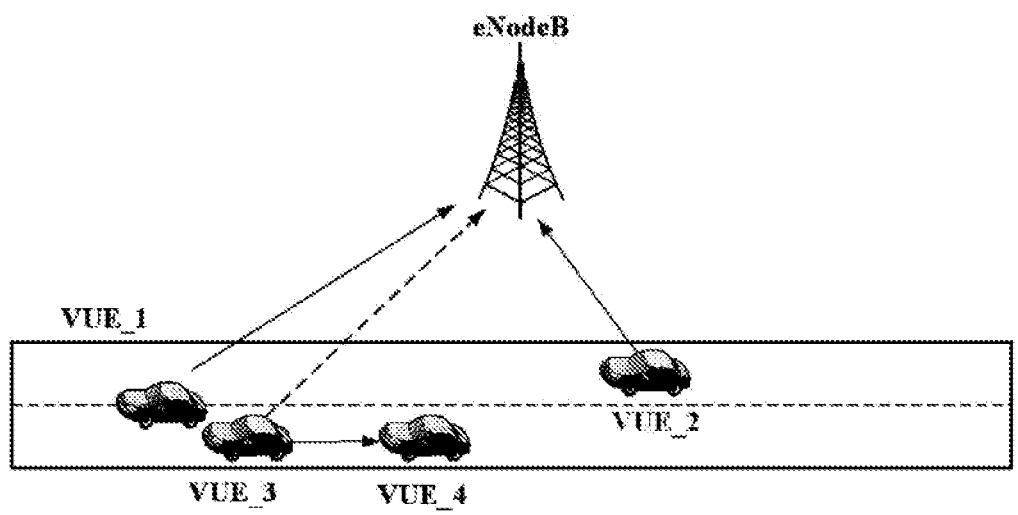
FIG. 8 is a schematic diagram of a scenario in which a network side device configures an SPS configuration for a user side device according to another embodiment of the present disclosure.

The case where the network side device 500 sets the SPS configuration for the user side device is described in detail below with reference to FIGS. 6 to 8. FIGS. 6 to 8 are schematic diagrams of a scenario in which a network side device configures an SPS configuration for a user side device according to an embodiment of the present disclosure. In the schematic diagrams shown in FIGS. 6 to 8, the user side device is an in-vehicle device, and the network side device is an eNodeB for serving the in-vehicle device.

As shown in FIG. 6, the in-vehicle devices VUE_1 and VUE_2 are located within the serving range of the eNodeB 1, and the in-vehicle devices VUE_3 and VUE_4 are located within the serving range of the eNodeB 2. The eNodeB 1 sets the SPS configuration for the in-vehicle devices VUE_1 and VUE_2. For example, the eNodeB 1 configures the first SPS configuration in the first DCI format for the in-vehicle device VUE_1, and configures the first SPS configuration in the second DCI format for the in-vehicle device WE 2. The eNodeB 2 sets the SPS configuration for the in-vehicle devices VUE_3 and VUE_4. For example, the eNodeB 2 configures the first SPS configuration in the first DCI format for the in-vehicle device VUE_4, and configures the first SPS configuration in the second DCI format for the in-vehicle device VUE_3. According to the embodiments described above, the eNodeB1 may receive the location information and the speed information transmitted by the VUE_1 and the VUE_2, thereby predicting the locations of the VUE_1 and the VUE_2 within a predetermined time period, for example, the predetermined time period is started from the current time t0 to the time t2, where time, points t1 and t2 are included. Further, the eNodeB2 may receive the location information and the speed information transmitted by the VUE_3 and the VUE_4, and the eNodeB1 may acquire the location information and the speed information transmitted by the VUE_3 and the VUE_4 through the X2 interface with the eNodeB2, thereby predicting the positions of the VUE_3 and the VUE_4 within a predetermined time period. FIG. 6 shows predicted positions of the in-vehicle devices VUE_1, VUE_2, VUE_3, and VUE_4 at time t1, and FIG. 7 shows predicted positions of the in-vehicle devices VUE_1, VUE_2, VUE_3, and VUE_4 at time t2.

As shown in FIG. 7, according to the predicted positions, at time t2, the in-vehicle device VUE_4 is close to VUE_1 and becomes the adjacent user side device of VUE_1, but VUE_4 is still located within the serving range of the eNodeB 2. It can be seen that since both VUE_1 and VUE_4 use the first SPS configuration in the first DCI format, and the distance between the two in-vehicle devices is very small, in a case where VUE_4 transmits a service to the eNodeB2 using the first SPS configuration in the first DCI format, the eNode1 may be interfered.

According to an embodiment of the present disclosure, in a case where the eNodeB 1 in FIGS. 6 and 7 is the network side device 500 illustrated in FIG. 5, and VUE_1 is the first user side device, VUE_2, VUE_3, and VUE_4 may be referred to as other user side devices. According to an embodiment of the present disclosure, the SPS configuration determining unit 512 in the processing circuit 510 may configure the first SPS configuration for the first user side device based on the location information of the first user side device within a predetermined time period and the location information of other user side devices within the predetermined time period, such that the first SPS configuration and the SPS configurations used by other user side devices within the serving range of the network side device 500 belong to different DCI formats and the first user side device and other user side devices adjacent thereto use different SPS configurations. Here, the SPS configurations used by other user side devices refer to SPS configurations used by other user side devices to transmit uplink services to network side devices for serving the other user side devices. In the examples shown in FIGS. 6 and 7, the SPS configuration can be configured for VUE_1 in the manner shown in Table 2.

TABLE 2

| t0-t1 | t1-t2 |
|---|---|
| The first SPS configuration in the first DCI format | The second SPS configuration in the first DCI format |

As shown in Table 2, in the period from time t1 to time t2, VUE_1 uses the second SPS configuration in the first DCI format, and VUE_4 uses the first SPS configuration in the first DCI format, thus VUE_4 does not generate interference when the VUE_1 is transmitting uplink service data.

In the scenario shown in FIG. 8, the in-vehicle devices VUE_1, VUE_2, VUE_3 and VUE_4 are located within the serving range of the eNodeB, and the eNodeB sets the SPS configurations for the in-vehicle devices VUE_1, VUE_2, VUE_3 and VUE_4. For example, the eNodeB configures the first configuration in the first DCI format for the in-vehicle device VUE_1, configures the first SPS configuration in the second DCI format for the in-vehicle device VUE_2, configures the first SPS configuration in the third DCI format for the in-vehicle device VUE_3, and configures the first SPS configuration in the fourth DCI format for the in-vehicle device VUE_4. FIG. 8 shows predicted positions of the in-vehicle devices VUE_1, VUE_2, VUE_3, and VUE_4 at time t2.

According to an embodiment of the present disclosure, in a case where the eNodeB in FIG. 8 is the network side device 500 illustrated in FIG. 5, and VUE_1 is the first user side device, VUE_2, VUE_3, and VUE_4 may be referred to as other user side devices. According to an embodiment of the present disclosure, the SPS configuration determining unit 512 in the processing circuit 510 may configure the first SPS configuration for the first user side device based on the location information of the first user side device within a predetermined time period and the location information of other user side devices within the predetermined time period, such that the first SPS configuration and the SPS configurations used by other user side devices within the serving range of the network side device 500 belong to different DCI formats and the first user side device and other user side devices adjacent thereto use different SPS configurations. Here, the SPS configurations used by other user side devices refer to SPS configurations used by other riser side devices to transmit service to the other user side devices. For example, although VUE_3 transmits uplink service to the eNodeB using the first SPS configuration in the third DCI format, VUE_3 may transmit a service to VUE_4 using the first SPS configuration in the first DCI format, thus generating interference to the uplink service transmitted by VUE_1 to the eNodeB. In this case, since the eNodeB knows in advance the SPS configuration used by the VUE_3 to transmit the service to the VUE_4, the SPS configuration of the VUE_1 may be configured reasonably, for example, the SPS configuration is configured for the VUE_1 in the manner shown in Table 2.

As shown in Table 2, in the time period t1 to t2, VUE_1 uses the second SPS configuration in the first DCI format, and VUE_3 uses the first SPS configuration in the first DCI for to transmit a service to VUE_4, thus VUE_3 does not generate interference when VUE_1 is transmitting uplink service data.

It can be seen that, according to an embodiment of the present disclosure, the network side device 500 may reasonably configure the SPS configuration for the user side device based on the predicted location of the user side device, to reduce interference at the network side device.

In the example described above, the positions of the first user side device and other user side devices are predictable for a predetermined time period. For example, if an intersection is not encountered within a predetermined time period, that is, the moving directions of the first user side device and other user side devices are unchanged, the positions at other moments are easily predicted based on the position information and the speed information of the user side device. In a case that the location of any one of the first user side device and the other user side devices within a predetermined time period is unpredicted, it is difficult for the network side device 500 to reasonably configure the SPS configuration according to the above embodiment.

According to an embodiment of the present disclosure, the processing unit 511 in the processing circuit 510 is further configured to perform an operation of receiving, from the first user side device, priority information of a service transmitted by the first user side device to the network side device 500, and the SPS configuration determining unit 512 is further configured to configure the first SPS configuration for the first user side device based on the priority information.

According to an embodiment of the present disclosure, in a case that the network side device 500 cannot predict the location of any of the first user side device and the other user side devices, the first user side device may be configured with the SPS configuration based on the priority information of the service. For example, in a case that the priority of the service is high, a SPS configuration with a small number of users in a certain range is configured, and the like. However, there may be other configuration rules, which are not limited in this disclosure.

According to an embodiment of the present disclosure, the SPS configuration determining unit 512 in the processing circuit 510 may be further configured to perform an operation of transmitting a notification to the first user side device to notify the first user side device to perform the SPS configuration reselection. That is, the network side device 500 may configure the SPS configuration for the first user side device according to a default rule, and notify the first user side device to reselect the SPS configuration by itself. According to an embodiment of the present disclosure, the first user side device may perform the SPS configuration reselection, for example, in the manner described in the first embodiment, and details are not described herein again.

According to an embodiment of the present disclosure, the SPS configuration determining unit 512 in the processing circuit 510 may be further configured to perform an operation of receiving and storing the reselected SPS configuration from the first user side device and storing the reselected SPS configuration. Next, the network side device 500 may receive the service transmitted from the first user side device using the reselected SPS configuration.

An embodiment in which the network side device 500 configures the SPS configuration of the user side device is described in detail above. According to an embodiment of the present disclosure, the network side device 500 may also measure all SPS configurations, and may perform SPS configuration reselection of a certain user side device as necessary.

Figure 9:
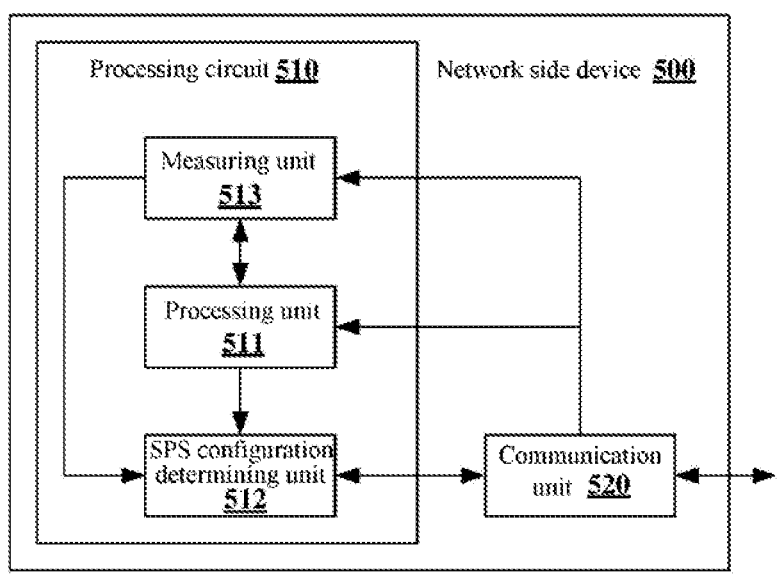
FIG. 9 is a structural block diagram of a network side device in a wireless communication system according to another embodiment of the present disclosure.

FIG. 9 is a structural block diagram of a network side device in a wireless communication system according to another embodiment of the present disclosure.

For example, as shown in FIG. 9, the processing circuit 510 may include a measuring unit 513, a processing unit 511 and a SPS configuration determining unit 512. The processing unit 511 and the SPS configuration determining unit 512 herein are described above, and are not described herein again.

According to an embodiment of the present disclosure, the measuring, unit 513 may measure resources corresponding to the first SPS configuration and other SPS configurations other than the first SPS configuration. Here, the other SPS configurations may include those SPS configurations other than the first SPS configuration in all SPS configurations that may be selected, that is, the other SPS configurations may include SPS configurations that belongs to the same DCI format as the first SPS configuration, and may also include the SPS configurations that do not belong to the same DCI format as the first SPS configuration. That is, the measuring unit 513 of the network side device 500 may measure the resources corresponding to all the SPS configurations that can be selected.

According to an embodiment of the present disclosure, the measuring the resource corresponding to the SPS configuration may include counting the number of users using the resource corresponding to the SPS configuration within a certain range. Here, since different user side devices within the serving range of the network side device 500 use different SPS configurations, the certain range may be greater than the serving range of the network side device 500. The network side device 500 may acquire the usage of the SPS configurations of the user side devices in the serving range of the other network side device from the other network side device through the X2 interface. That is, the usage of the SPS configuration of each user side device is shared among different network side devices.

According to an embodiment of the present disclosure, in a case that the number of user side devices using the first SPS configuration within a predetermined range exceeds a second threshold, the SPS configuration determining unit 512 may determine an SPS configuration reselection result of the first user side device.

Here, in a case that the number of user side devices using the first SPS configuration is large, it indicates that there is a possibility of interference, thus the network side device 500 may determine the SPS configuration reselection result of the first user side device.

According to an embodiment of the present disclosure, the SPS configuration determining unit 512 in the processing circuit 510 may be configured to perform an operation of in a case that there is at least one other SPS configuration whose number of user side devices is, less than second threshold, reselecting first user side device from first SPS configuration to one of the one or more other SPS configurations.

According to an embodiment of the present disclosure, the SPS configuration determining unit 512 may select one SPS configuration from one or more other SPS configurations according to certain criteria, and reselect the first user side device from the first SPS configuration to the SPS configuration. For example, one SPS configuration is randomly selected from one or more other SPS configurations.

According to an embodiment of the present disclosure, the SPS configuration determining unit 512 may further reselect the first user side device from the first SPS configuration to an SPS configuration belonging to the same downlink control information (DCI) format as the first SPS configuration in the one or more other SPS configurations.

That is, the SPS configuration determining unit 512 preferably reselects the first SPS configuration to other SPS configurations that belong to the same DCI format. If the SPS configuration determining unit 512 can not find a suitable SPS configuration for reselection under the DCI format, it may sought other SPS configurations in the DCI format that are not used by user side devices other than the first user side device within the serving range of the network side device 500. For example, in a case that the first user side device uses the first SPS configuration in the first DCI format, the SPS configuration determining unit 512 first searches other SPS configurations in the first DCI format for a SPS configuration in which the number of users is less than the second threshold. If there is no other SPS configuration in which the number of users is less than the second threshold in the first DCI format, it is required to search for the SPS configuration in which the number of users is less than the second threshold from the DCI format that is not occupied in the coverage of the network side device 500.

As can be seen, according to an embodiment of the present disclosure, the SPS configuration determining unit 512 may perform the SPS configuration reselection of the user side device, such that the number of users under each SPS configuration tends to be equalized. In this way, potential interference at the network side device 500 is avoided.

According to an embodiment of the present disclosure, the SPS configuration determining unit 512 may determine an SPS configuration reselection result of the first user side device based on the priority information of the service transmitted from the first user side device to the network, side device 500. For example, the first user side device is reselected from the first SPS configuration to one of one or more other SPS configuration only in a case that the priority of the service transmitted by the first user side device to the network side device 500 is low, for example, below a certain threshold. Further, the SPS configuration determining unit 512 may further determine an SPS configuration reselection result of the first user side device based on the priority information of the service transmitted by the first user side device to the network side device 500, and the priority information of the service transmitted by other user side devices using the same SPS configuration as the first user side device within a certain range. For example, in a case that the priority of the service transmitted by the first user side device to the network side device 500 is in a lower position among all the services transmitted by the user side devices configured with the first SPS configuration in the certain range, the first user side device is reselected from the first SPS configuration to one of the one or more other SPS configurations. In this way, it is ensured that the user side devices with lower service priorities are adjusted as much as possible, and those user side devices with higher service priorities are not adjusted.

According to an embodiment of the present disclosure, the SPS configuration determining unit 512 may further determine the SPS configuration reselection result of the first user side device based on a time when the first user side device requests the network side device 500 for the SPS configuration. For example, the first user side device is reselected from the first SPS configuration to one of one or more other SPS configurations only in a case that the first user side device requests the network side device 500 for the SPS configuration to be late, for example, when the time difference from the time of requesting for the SPS configuration to the current time is less than a certain threshold. Further, the SPS configuration determining unit 512 may further determine an SPS configuration reselection result of the first user side device based on the time of requesting for the SPS configuration by the first user side device from the network side device 500, and the time of requesting for the SPS configuration by other user side devices using the same SPS configuration as the first user side device within a certain range. For example, in a case that the time when the first user side device requests the SPS configuration from the network side device 500 is in a later position in all the time when the user side device using the first SPS configuration requests the SPS configuration, the first user side device is reselected from the first SPS configuration to one of One or more other SPS configurations in this way, it can be ensured that the user side devices that request the SPS configuration later are adjusted as much as possible, and those user side devices that request the SPS configuration earlier are not adjusted.

However according to an embodiment of the present disclosure, the SPS configuration determining unit 512 may further determine the SPS configuration reselection result of the first user side device by considering both the priority of the service and the time of requesting the SPS configuration. In this way, it is ensured that the user side devices with a low priority or that request the SPS configuration later are adjusted as much as possible, thereby ensuring the use of the SPS configuration by other user side devices.

According to an embodiment of the present disclosure, the SPS configuration determining unit 512 in the processing circuit 510 may be further configured to perform an operation of: determining an SPS configuration reselection result of the first user side device based on the priority information of the service transmitted from the first user side device to the network side device 500, in a case that there is no other SPS configuration in which the number of user side device is less than the second threshold.

According to an embodiment of the present disclosure, in a case that there is no other SPS configuration in which the number of user side devices is less than the second threshold, it indicates that the number of users of all SPS configurations is greater than or equal to the second threshold. In this case, there is a possibility of potential interference, but a suitable SPS configuration is not found. In this case, the SPS configuration reselection result of the first user side device may be determined based on the priority of the service.

According to an embodiment of the present disclosure, the SPS configuration determining unit 512 in the processing circuit 510 may be further configured to perform an operation of: doubling a transmission period in the first SPS configuration in a case that the priority of the service transmitted by the first user side device to the network side device 500 is less than a third threshold. Further, the SPS process of the first user side device may also be directly released. It can be seen that, according to an embodiment of the present disclosure, in a case that the priority of the service transmitted by the first user side device to the network side device 500 is low, the transmission period of the SPS configuration used by the first user side device is doubled to reduce interference to other user side devices with higher priority. Further, the SPS process of the first user side device may be directly released, to ensure the usage of the SPS resources by those user side devices with higher service priorities.

According to an embodiment of the present disclosure, the SPS configuration determining unit 512 in the processing circuit 510 may be further configured to perform an operation of: perform no SPS configuration reselection of the first user side device in a case that the priority of the service transmitted by the first user side device to the network side device 500 is greater than or equal to a third threshold. That is, the first use side device continues to use the first SPS configuration. Further, the SPS configuration determining unit 512 may further notify, through the communication unit 520, the network side devices corresponding to the user side devices with a low service priority in using the first SPS configuration, so that the network side devices double the period of the SPS configuration used by the user side device with a low service priority, or release the SPS processes of the user side devices. In this way, the interference of the other user side devices to the first user side device can be reduced, and the usage of the resource of the first SPS configuration by the first user side device with a higher service priority can be ensured.

The reselection of the SPS configuration of the user side device by the network side device 500 is described in detail above, such that the interference generated at the network side device 500 can be reduced, making the usage of the SPS configuration more reasonable.

According to an embodiment of the present disclosure, the SPS configuration determining unit 512 in the processing circuit 510 may be further configured to perform an operation of receiving an SPS configuration reselection request from the first user side device. Here, the SPS configuration determining unit 512 may receive an SPS configuration reselection request from the first user side device through the communication unit 520. That is, the reselection process of the SPS configuration of the user side device by the network side device 500 is performed based on the SPS configuration reselection request of the user side device. Here, the user side device may be, for example, the electronic device 100 in the first embodiment, and thus the SPS configuration reselection request may be transmitted to the network side device 500 in a case that the user side device cannot find the SPS configuration in which the received signal strength gradually decreases, and the link quality between the electric device 100 and the network side device 500 is poor.

According to an embodiment of the present disclosure, the reselection process of the SPS configuration of the user side device by the network side device 500 may also be periodically triggered. That is, the network side device 500 periodically measures all SPS configurations, and initiates a reselection process of the SPS configuration when it is found that the number of users using a certain SPS configuration exceeds a second threshold within a predetermined range.

Figure 10:
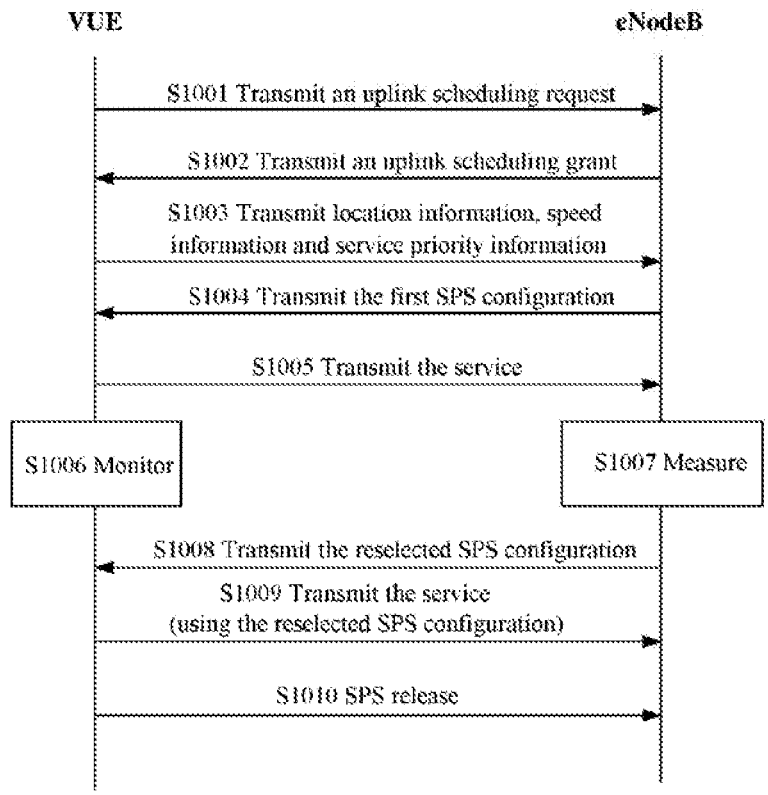
FIG. 10 is a signaling flowchart of a SPS configuration reselection by a network side device according to an embodiment of the present disclosure.

FIG. 10 is a signaling flowchart, of a SPS configuration reselection by a network side device according to an embodiment of the present disclosure.

As shown in FIG. 10, the VUE represents the user side device described above, for example, the electronic device 100, and the eNodeB represents the network side device 500 described above. First, in step S1001, the VUE transmits an uplink scheduling, request to the eNodeB. Next, in step S1002, the eNodeB transmits an uplink scheduling grant to the VUE, Next, in step S1003, the VUE reports the location information and the speed information to the eNodeB. Optionally, the VUE may also report the service priority information to the eNodeB. Next, in step S1004, the eNodeB determines the SPS configuration of the VUE and informs the VUE of the SPS configuration, which is, for example, the first SPS configuration described above. Next, in step S1005, the VUE transmits the service to the eNodeB using the first SPS configuration. In step S1006, the VUE monitors the first SPS configuration and other SPS configurations. At the same time, in step S1007, the eNodeB may measure all SPS configurations. If no SPS configuration reselection is triggered, the VUE transmits the service to the eNodeB continually using the first SPS configuration. When the eNodeB triggers the SPS configuration, in step S1008, the eNodeB determines the reselected SPS configuration and transmits the reselected SPS configuration to the VUE. Next, in step S1009, the VUE may continue to transmit the service to the eNodeB by using the reselected SPS configuration until the SPS process is released in step S1010.

It is to be noted that FIG. 10 only shows the case where the reselection process of the SPS configuration includes the eNodeB performing measurement and triggering, and the case where the eNodeB finds an SPS configuration suitable for reselection. However, FIG. 10 is merely exemplary. The eNodeB may not find an SPS configuration suitable for reselection. The reselection process of the SPS configuration may also be triggered by the VUE as the user side device transmitting an SPS reselection request to the eNodeB.

As shown above, in the first embodiment, the method in which the electronic device 100 monitors the resources corresponding to the SPS configuration to trigger the SPS configuration reselection is described in detail. In the second embodiment, the method in which the network side device 500 measures all SPS configurations to trigger the SPS configuration reselection is described in detail. According to an embodiment of the present disclosure, the two methods may be implemented simultaneously. For example, in the signaling flowcharts shown in FIG. 4 and FIG. 10, when the VUE as the user side device transmits an uplink service to the eNodeB as the network side device, the VUE monitors the first SPS configuration and other SPS configurations, and the eNodeB measures all SPS configurations in a case that the VUE or the eNodeB finds that the SPS configuration reselection condition is met, the reselection process of the SPS configuration may be performed. Further, after performing the reselection process of the SPS configuration, the VUE continues to monitor the first SPS configuration and other SPS configurations, and the eNodeB continues to measure all SPS configurations. In a case that the VUE or the eNodeB finds that the SPS configuration reselection condition is met again, the reselection process of the SPS configuration may be performed again.

The network side device 500 according to an embodiment of the present disclosure is described in detail above. According to the network side device 500 of the present disclosure, the SPS configuration may be set for the user side device based on the location information and the speed information of the user side device, thereby setting the SPS configuration of each user side device more reasonably, and reducing the possibility of interference. Further, the network side device 500 may also reselect the SPS configuration of the user side device based on the usage of all SPS configurations, thereby further reducing the possibility of interference.

Since the user side device described in this embodiment may be the electronic device 100 in the first embodiment, various specific embodiments of the respective processes performed by the electronic device 100 according to an embodiment of the present disclosure are applicable herein. Various specific embodiments of the respective processes performed by the network side device 500 according to an embodiment of the present disclosure are also applicable to the first embodiment.

Third Embodiment

Figure 11:
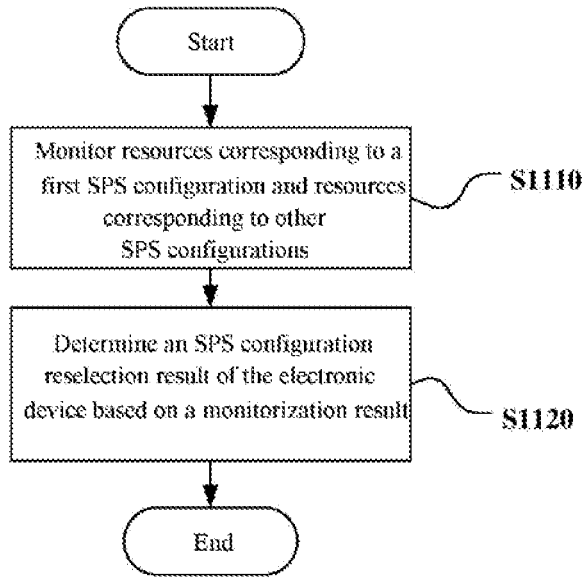
FIG. 11 is a flowchart of a wireless communication method according to an embodiment of the present disclosure.

Next, a wireless communication method according to an embodiment of the present disclosure is described with reference to FIG. 11. FIG. 11 is a flowchart of a wireless communication method according to an, embodiment of the present disclosure. The method illustrated in FIG. 11 is performed by an electronic device in, a wireless communication system, such as electronic device 100 in FIGS. 1 and 3.

As shown in FIG. 11, first, in step S1110, the resources corresponding to a first SPS configuration used by the electronic device and resources corresponding to other SPS configurations other than the first SPS configuration are monitored.

Next, in step S1120, an SPS configuration reselection result of the electronic device is determined based on the monitorization result.

Preferably, the monitoring the resources corresponding to the first SPS configuration and the resources corresponding to the other SPS configurations includes: monitoring received signal strength on the resources corresponding to the first SPS configuration and the resources corresponding to the other SPS configurations.

Preferably, the determining an SPS configuration reselection result of the electronic device includes: in a case that the received signal strength on the resources corresponding to the first SPS configuration gradually increases and the received signal strength on the resources corresponding to one or more SPS configurations in the other SPS configurations gradually decreases, reselecting the SPS configuration of the electronic device to one of the one or more SPS configurations.

Preferably, the reselecting the SPS configuration of the electronic device to one of the one or more SPS configurations includes: reselecting the SPS configuration of the electronic device to an SPS configuration with a highest average received signal strength change rate in one or more SPS configurations.

Preferably, the method further includes: transmitting the reselected SPS configuration to the network side device serving the electronic device.

Preferably, the method further includes: transmitting a service to the network side device based on the reselected SPS configuration.

Preferably, the determining the SPS configuration reselection result of the electronic device includes: in a case that the received signal strength on the resources corresponding to the first SPS configuration gradually increases and there is no other SPS configuration in which received signal strength on corresponding resources gradually decreases, determining ail SPS configuration reselection result of the electronic device based on link quality between the electronic device and the network side device for serving the electronic device.

Preferably, the determining an SPS configuration reselection result of the electronic device based on link quality between the electronic device and the network side device for serving the electronic device includes: transmitting an SPS configuration reselection request to the network side device in a case that the link quality between the electronic device and the network side device is less than a first threshold; and Preferably, the determining an SPS configuration reselection result of the electronic device based on link quality between the electronic device and the network side device for serving the electronic device includes: performing no SPS configuration reselection of the electronic device in a case that the link quality between the electronic device and the network side device is greater than or equal to the first threshold.

Preferably, the method further includes: receiving the first SPS configuration from the network side device for serving the electronic device.

Preferably, the method further includes: transmitting, to the network side device, location information and speed information of the electronic device and priority information of a service transmitted to the network side device.

Preferably, the method further includes: selecting the first SPS configuration from a resource pool.

Preferably, the other SPS configurations and the first SPS configuration belong to the same downlink control information DCI format.

Various implementations of steps above in the wireless communication methods for the wireless communication system according to the embodiments of the present disclosure are described in detail in the description of the electric device 100 in the above, which are not repeated here. Thus, various embodiments describing electronic device 100 are applicable herein.

Fourth Embodiment

Figure 12:
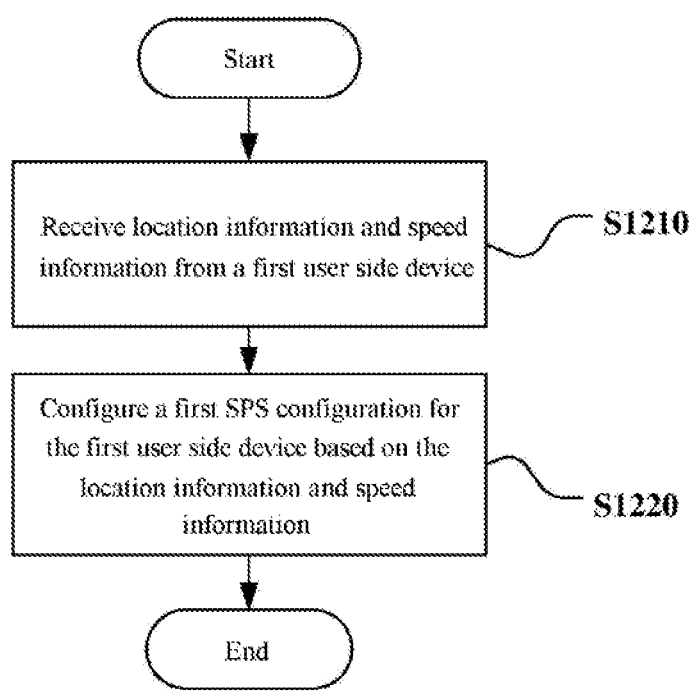
FIG. 12 is a flowchart of a wireless communication method according to another embodiment of the present disclosure.

A wireless communication method according to another embodiment of the present disclosure is described subsequently with reference to FIG. 12. FIG. 12 is a flowchart of a wireless communication method according to another embodiment of the present disclosure. The method shown in FIG. 12 is performed by a network side device in the wireless communication system, such as a network side device 500 shown in FIGS. 5 and 9.

As shown in FIG. 12, first, in step S1210, location information and speed information of a first user side device within a serving range of the network side device are received from the first user side device.

Next, in step S1220, the first SPS configuration is configured for the first user side device based on the location information and the speed information.

Preferably, the method further includes: predicting location information of the first user side device within a predetermined time period based on the location information and the speed information; and configuring the first SPS configuration for the first user side device based on the location information of the first user side device in the predetermined time period.

Preferably, the method further includes: predicting location information of the other user side devices other than the first user side device within a predetermined time period; and configuring the first SPS configuration for the first user side device based on the location information of the first user side device in the predetermined time period and the location information of the other user side devices within the predetermined time period.

Preferably, the method further includes: receiving, from the first user side device, priority information of the service transmitted from the first user side device to the network side device; and configuring the first SPS configuration for the first user side device based on the priority information.

Preferably, the method further includes: measuring resources corresponding to the first SPS configuration and the other SPS configurations other than first SPS configuration; and determining an SPS configuration reselection result of the first user side device in a case that the number of user side devices using the first SPS configuration within the predetermined range exceeds the second threshold.

Preferably, the determining an SPS configuration reselection result of the first user side device includes: in a case that there is at least one other SPS configuration whose number of user side devices is less than the second threshold, reselecting the first side device from the first SPS configuration to one of the one or more other SPS configurations.

Preferably, the reselecting the first user side device from the first SPS configuration to one of the one or mare other SPS configurations includes: reselecting the first user side device from the first SPS configuration to an SPS configuration belonging to a same downlink control information (DCI) format as the first SPS configuration in the one or more other SPS configurations.

Preferably, the determining the SPS configuration reselection result of the first user side device further includes: in a case that there is no other SPS configuration in Which the number of user side devices is less than the second threshold, determining an SPS configuration reselection result of the first user side device based on the priority information of the service transmitted from the first user side device to the network side device.

Preferably, the determining the SPS configuration reselection result of the first user side device further includes: releasing an SPS progress of the first user side device in a case that the priority of the service transmitted from the first user side device to the network side device is less than a third threshold; and Preferably, the determining the SPS configuration reselection result of the first user side device further includes: performing no SPS configuration reselection of the first user side device in a case that the priority of the service transmitted from the first user side device to the network side device is greater than or equal to the third threshold.

Preferably, the method further includes: receiving an SPS configuration reselection request from the first user side device.

Various implementations of steps above in the wireless communication methods for the wireless communication system according to the embodiments of the present disclosure are described in detail in the description of the network side device 500 in the above, which are not repeated here. Thus, various embodiments describing the network side device 500 are applicable herein.

The technology in the present disclosure can be applied into various products. For example, the network side device in the present disclosure may be a base station, which may be implemented as any type of evolved node B (eNB), such as a macro eNB and a small eNB. The small eNB may be an eNB of a cell with a coverage less than that of a macro cell, such as a pico-eNB, a micro-eNB and a household (femto) eNB. Alternatively, the base station may be implemented as any other types of base stations, such as a NodeB and a Base Transceiver Station (BTS). The base station may include a main body (that is also referred to as a base station device) configured to control wireless communication, and one or more remote wireless heads (RRH) disposed in a different place from the main body. In addition, various types of terminals, which will be described below, may each operate as the base station by temporarily or semi-persistently executing a base station function.

For example, the user side device mentioned in the present disclosure may be a UE, which may be implemented as a mobile terminal (such as a smartphone, a tablet personal computer (PC), a notebook PC, a portable game terminal, a portable/dongle mobile router and a digital camera device) or a vehicle terminal (such as an automobile navigation device). The UE may also be implemented as a terminal performing machine to machine (M2M) communication (also referred to as a machine-type communication (MTC) terminal). In addition, the UE may be a wireless communication module installed on each of the above terminals (such as an integrated circuit module including a single chip).

Figure 13:
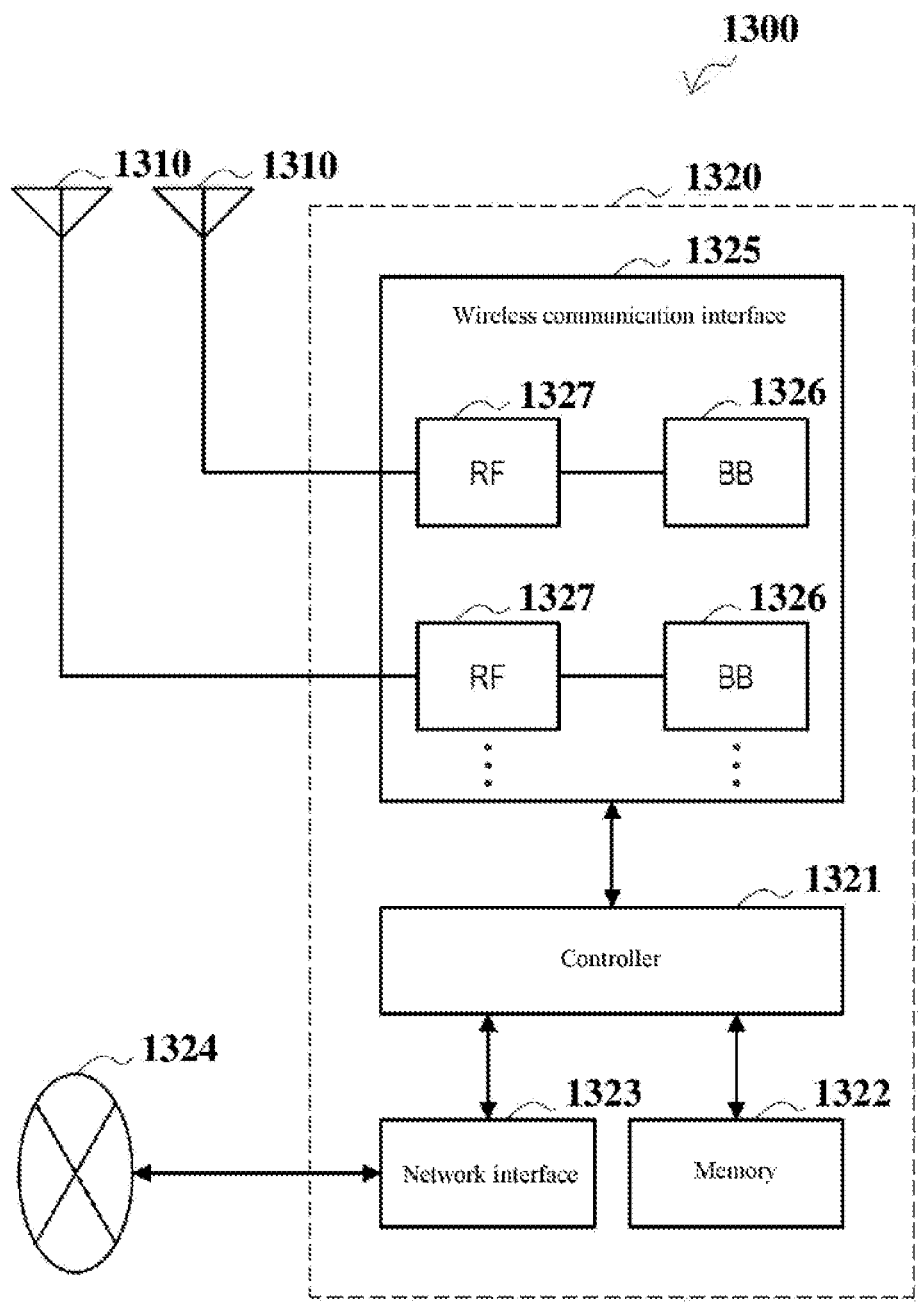
FIG. 13 is a block diagram of a first example of a schematic configuration of an Evolution Node Base Station (eNB) to which the present disclosure may be applied.

FIG. 13 is a block diagram illustrating a first example of a schematic configuration of an eNB to which the technology according to the present disclosure may be applied. The eNB 2400 includes one or more antennas 1310 and a base station device 1320. The base station device 1320 and each of the antennas 1310 may be connected with each other via RF cable.

Each of the antennas 1310 includes one or more antenna elements (such as multiple antenna elements included in a multiple-input multiple-output (MIMO antenna), and are used for transmitting and receiving a wireless signal by the base station device 132). As shown in FIG. 13, the eNB may include multiple antennas 1310. For example, the multiple antennas 1310 may be compatible with multiple bands used by the eNB 1300. Although the eNB 1300 including multiple antennas 1310 is shown in FIG. 13, the eNB 1300 may include a single antenna 1310.

The base station device 1320 includes a controller 1321, a memory 1322, a network interface 1323, and a wireless communication interface 1325.

The controller 1321 may be, for example, a CPU or a DSP, and operate various functions of the higher layer of the base station device 1320. For example, the controller 1321 generates a data packet based on the data in the signal processed by the wireless communication interface 1325, and transfers the generated packet via the network interface 1323. The controller 1321 may bundle data from multiple baseband processors to generate the bundled data, and transfer the generated bundled data. The controller 1321 may have the logical function to perform the control such as wireless resource control, wireless carrying control, mobility management, admission control and scheduling. The control may be performed in conjunction with the neighboring eNB or core network node. The memory 1322 includes RAM and ROM, and stores the program to be performed by the controller 1321 and various types of control data (such as a terminal list, transmission power data and scheduling data).

The network interface 1323 is a communication interface for connecting the base station device 1320 to the core network 1324. The controller 1321 may communication with a core network node or another eNB via the network interface 1323. In this case, the eNB 1300 and the core network node or another eNB may be connected to each other via a logic interface (such as an Si interface or an X2 interface). The network interface 1323 may be a wired communication interface or a wireless communication interface for a wireless backhaul line. If the network interface 1323 is a wireless communication interface, the network interface 1323 may use a higher frequency band for wireless communication as compared with that used by the wireless communication interface 1325.

The wireless communication interface 1325 supports any cellular communication scheme (such as Long Term Evolution (LTE) and LTE-advanced), and provides a wireless connection to a terminal located in a cell of the eNB 1300 via the antenna 1310. The wireless communication interface 2125 may typically include for example a base band (BB) processor 1326 and an RF circuit 1327. The BB processor 1326 may perform for example coding/decoding, modulation/demodulation and multiplexing/de-multiplexing, and perform various types of signal processes of the layer (for example L1, media access control (MAC), wireless link control (RLC) and packet data convergence protocol (PDCP)). Instead of the controller 1321, the BB processor 1326 may have a portion or all of the above logical functions. The BB processor 1326 may be a memory storing communication control programs, or a module including a processor and a related circuit which are configured to execute programs. The update program may change the function of the BB processor 1326. The module may be a card or blade inserted into the slot of the base station, device 1320. Alternatively, the module may be a chip mounted on the card or the blade. The RF circuit 1327 may include for example a mixer, a filter and an amplifier, and transmit and receive the wireless signal via the antenna 1310.

As shown in FIG. 13, the wireless communication interface 1325 may include multiple BB processors 1326. For example, the multiple BB processors 1326 may compatible with the multiple frequency bands used by the eNB 1300. As shown in FIG. 13, the wireless communication interface 1325 may include multiple RF circuits 1327. For example, the multiple RF circuits 1327 may be compatible with multiple antenna elements. Although FIG. 13 illustrates the example in which the wireless communication interface 1325 includes the multiple BB processors 1326 and the multiple RF circuits 1327, the wireless communication interface 1325 may also include a single BB processor 1326 or a single RF circuit 1327.

Figure 14:
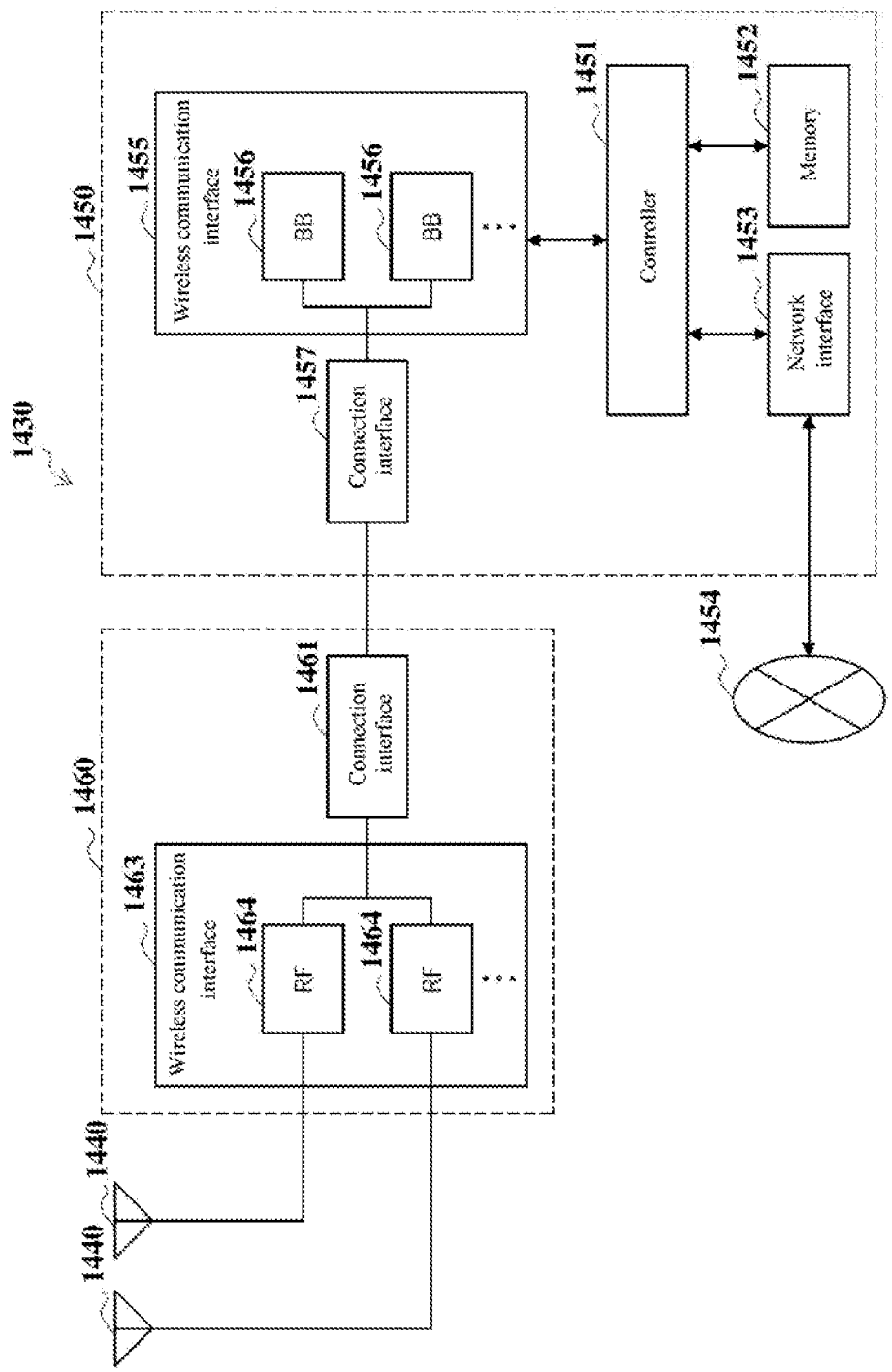
FIG. 14 is block diagram showing a second example of the schematic configuration of the eNB to which the present disclosure may be applied.

FIG. 14 is a block diagram showing a second example of a schematic configuration of the eNB to which the technology of the present disclosure may be applied. An eNB 1430 includes one or more antennas 1440, a base station device 1450 and an RRH 1460. Each antenna 1440 and the RRH 1760 may be connected to each other via an RF cable. The base station device 1450 and RRH 1460 may be connected to each other via a high-speed line such as fiber cable.

Each of the antennas 1440 includes a single or multiple antenna elements (such as multiple antenna elements included in a multiple-input multiple-output (MIMO) antenna), and is for the RRH 1460 to transmit and receive a wireless signal. As illustrated in FIG. 14, the eNB 1430 may include multiple antennas 1440. For example, the multiple antennae 1410 may be compatible with multiple frequency bands used by the eNB 1430. Although FIG. 14 shows the example in which the eNB 1430 includes the multiple antennas 1440, the eNB 1430 may also include a single antenna 1440.

The base station device 1450 includes a controller 1451, a memory 1452, a network interface 1453, a wireless communication interface 1455, and a connection interface 1457. The controller 1451, the memory 1452 and the network interface 1453 are respectively the same as the controller 1321, the memory 1322 acid the network interface 1323 described referring to FIG. 13.

The wireless communication interface 1455 supports any cellular communication solution (such as LTE and LTE-advanced), and provides wireless communication with a terminal located in a sector corresponding to the RRH 1460 via the RRH 1460 and the antenna 1440. The wireless communication interface 1455 may generally include a BB processor 1456 for example. Other than connecting to an RF circuit 1464 of the RRH 1460 via the connection interface 1457, the BB processor 1456 is the same as the BB processor 1326 described with reference to FIG. 13. As shown in FIG. 14, the wireless communication interface 1455 may include multiple BB processors 1456. For example, the multiple BB processors 1456 may be compatible with multiple frequency bands used by the eNB 1430. Although an example in which the wireless communication interface 1455 includes multiple BB processors 1456 is shown in FIG. 14, the wireless communication interface 1455 may include a single BB processor 1456.

The connection interface 1457 is configured to connect the base station device 1450 (wireless communication interface 1455) to the RRH 1460. The connection interface 1457 may be a communication module for connecting the base station device 1450 (wireless communication interface 1455) to a communication in the above high-speed line of the RRH 1460.

The RRH 1460 includes a connection interface 1461 and a wireless communication interface 1463.

The connection interface 1461 is an interface for connecting the RRH 1460 (the wireless communication interface 1463) to the base station device 1450. The connection interface 1461 may also be a communication module in the high-speed line.

The wireless communication interface 1463 transmits and receives wireless signals via the antenna 1440. The wireless communication interface 1463 may typically include for example a RF circuit 1464. The RF circuit 1464 may include for example a mixer, a filter and an amplifier, and transmits and receives the wireless signal via the antenna 1440. The wireless communication interface 1463 may include multiple RF circuits 1464, as illustrated in FIG. 14. For example, multiple RF circuits 1464 may support multiple antenna elements. Although an example in which the wireless communication interface 1463 including, multiple RF circuits 1464 is shown in FIG. 14, the wireless communication interface 1463 may include a single RF circuit 1464.

In the eNB 1300 shown in FIG. 13 and eNB 1430 shown in FIG. 14, the processing circuit 510 described with reference to FIG. 5 and the processing unit 511 and the SPS configuration determining unit 512 in the processing circuit 510, and the processing circuit 510 described with reference to FIG. 9. and the processing unit 511, the SPS configuration determining unit 512 and the measuring unit 513 in the processing circuit 510 may be implemented by the controller 1321 and/or the controller 1451, and the 111 communication unit 520 described with reference to FIG. 5 and FIG. 9 may be implemented by the wireless communication interface 1325 and the wireless communication interface 1455 and/or the wireless communication interface 1463. At least a part of the functions may be implemented by a controller 1321 and a controller 1451. For example, the controller 1321 and/or the controller 1451 may perform functions of storing location information and speed information of the user side device and configuring and reselecting the SPS configuration for the user side device by executing instructions stored in the corresponding memory.

Figure 15:
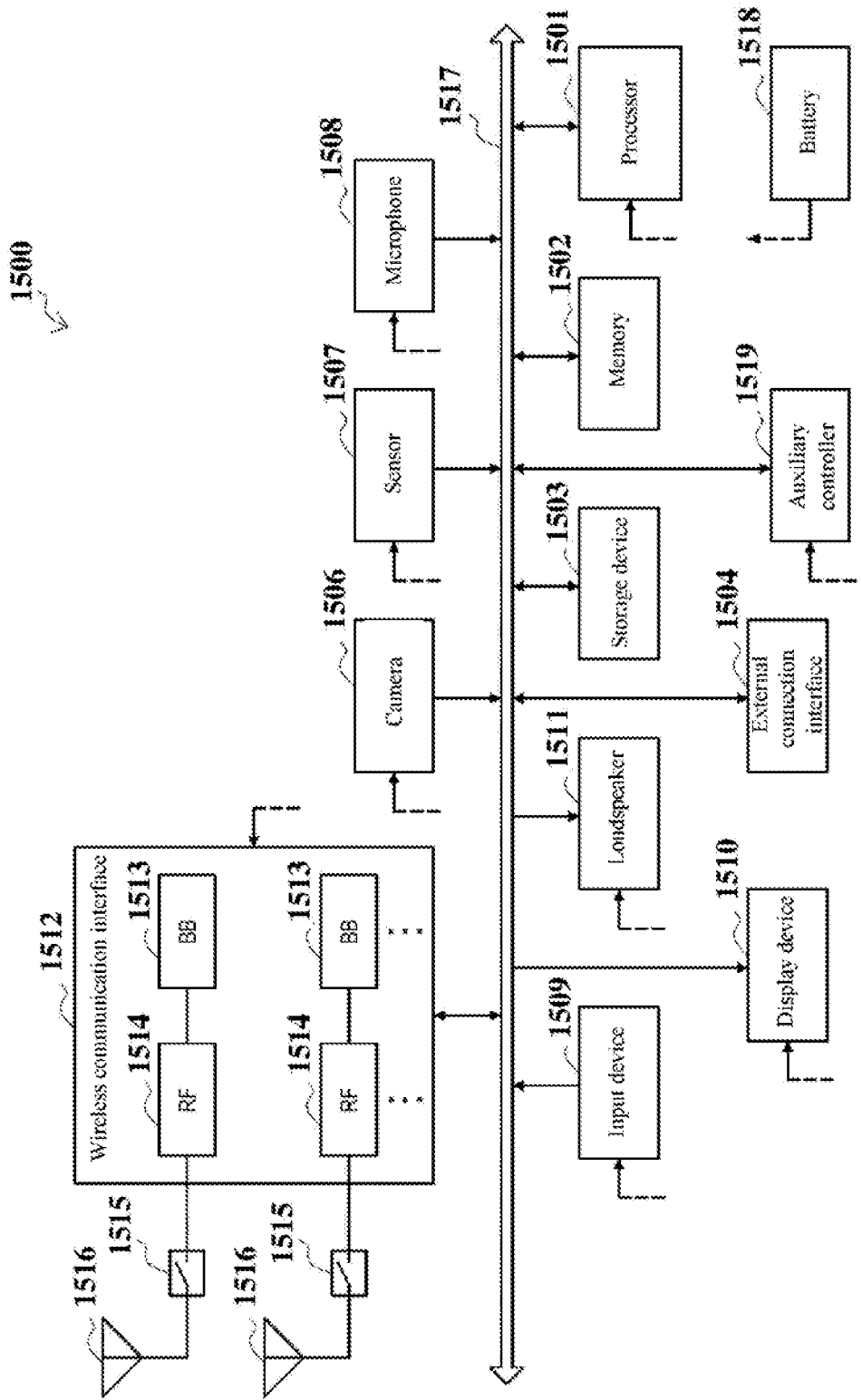
FIG. 15 is a block diagram showing an example of a schematic configuration of a smartphone to which the present disclosure may be applied.

FIG. 15 is a block diagram showing a schematic configuration example of a smartphone 1500 to which the technology of the present disclosure may be applied. The smartphone 1500 includes a processor 1501, a memory 1502, a storage device 1503, an external connection interface 1504, a camera 1506, a sensor 1507, a microphone 1508, an input device 1509, a display device 1510, a speaker 1511, a wireless communication interface 1512, one or more antenna switches 1515, one or more antennas 1516, a bus 1517, a battery 1518, and an auxiliary controller 1519.

The processor 1501 may be, for example, CPU or System on Chip (SoC), and controls functions of an application layer and another layer of the smartphone 1500. The memory 1502 includes a RAM and a ROM, and stores data and programs executed by the processor 1501. The storage device 1503 may include a memory medium, such as a semiconductor memory and a hard disc. The external connection interface 1504 is an interface configured to connect an external device (such as a memory card and a universal serial bus (USB) device) to the smart phone 1500.

The camera 1506 includes an image sensor (such as a Charge Coupled Device (CCD) and a Complementary Metal Oxide Semiconductor (CMOS)) and generates a captured image. The sensor 1507 may include, a set of sensors, such as a measurement sensor, a gyro sensor, a geomagnetism sensor, and an acceleration sensor. The microphone 1508 converts the sound input to the smartphone 1500 into an audio signal. The input device 1509 includes, for example, a touch sensor configured to detect touch on a screen of the display device 1510, a keypad, a keyboard, a button or a switch, and receives an operation or information input from the user. The display device 1510 includes a screen (such as liquid crystal display (LCD) and organic light-emitting diode (OLED) display), and displays output image of the smart phone 1500. The speaker 1511 converts audio signals output from the smart phone 1500 into sounds.

The wireless communication interface 1512 supports any cellular communication scheme (such as LTE and LTE-Advanced), and performs wireless communication. The wireless communication interface 1512 may include for example a BB processor 1513 and an RF circuit 1514. The BB processor 1513 may perform for example coding/decoding, modulation/demodulation and multiplexing/de-multiplexing, and perform various types of signal processes for wireless communication. Meanwhile, the RF circuit 1514 may include, for example, a mixer, a filter, and an amplifier, and transmits and receives wireless signals via the antenna 1516. The wireless communication interface 1512 may be one chip module having the BB processor 1513 and the RF circuit 1514 integrated therein. The wireless communication interface 1512 may include the multiple BB processors 1513 and the multiple RF circuits 1514, as illustrated in FIG. 15. Although FIG. 15 illustrates the example in Which the wireless communication interface 1512 includes the multiple BB processors 1513 and the multiple RF circuits 1514, the wireless communication interface 1512 may also include a single BB processor 1513 or a single RF circuit 1514.

Furthermore, in addition to a cellular communication scheme, the wireless communication interface 1512 may support another type of wireless communication scheme such as a short-distance wireless communication scheme, a near field communication scheme, and a wireless local area network (LAN) scheme. In this case, the wireless communication interface 1512 may include the BB processor 1513 and the RF circuit 1514 for each wireless communication scheme.

Each of the antenna switches 1515 reselects connection destinations for the antennas. 1516 among multiple circuits (such as circuits for different wireless communication schemes) included in the wireless communication interface 1512.

Each of the antennas 1516 includes a single or multiple antenna elements (such as multiple antenna elements included in an MIMO antenna), and is used for the wireless communication interface 1512 to transmit and receive wireless signals. The smartphone 1500 may include the multiple antennas 1516, as illustrated in FIG. 15. Although FIG. 15 illustrates the example in which the smartphone 1500 includes the multiple antennas 1516, the smartphone 1500 may also include a single antenna 1516.

Furthermore, the smartphone 1500 may include the antenna 1516 with respect to each wireless communication scheme. In this case, the antenna switches 1515 may be omitted in the configuration of the smartphone 1500.

The bus 1517 connects the processor 1501, the memory 1502, the storage device 1503, the external connection interface 1504, the camera 1506, the sensor 1507, the microphone 1508, the input device 1509, the display device 1510, the speaker 1511, the wireless communication interface 1512, and the auxiliary controller 1519 to each other. The battery 1518 supplies power to respective blocks of the smartphone 1500 illustrated in FIG. 15 via feeders which are partially shown with dashed lines in the figure. The auxiliary controller 1519, for example, operates a minimum necessary function of the smart phone 1500, for example, in a sleep mode.

In the smartphone 1500 shown in FIG. 15, the processing circuit 110 described with reference to FIG. 1 and the monitoring unit 111 and the SPS configuration determining unit 112 included in the processing circuit 110 and the processing circuit 110 described with reference to FIG. 3 and the monitoring unit 111, the SPS configuration determining unit 112 and the processing unit 113 included in the processing circuit 110 may be implemented by the processor 1501 or the auxiliary controller 1519. In addition, the communication unit 120 described with reference to FIG. 1 and FIG. 3 may be implemented by the wireless communication interface 1512. At least a portion of the functions of the transceiving unit 202 may be implemented by the processor 1501 and the auxiliary controller 1519. For example, the processor 1501 or the auxiliary controller 1519 may perform the functions of monitoring the resource corresponding to the SPS configuration and determining the SPS configuration reselection result by executing instructions stored in the memory 1502 or the storage device 1503.

Figure 16:
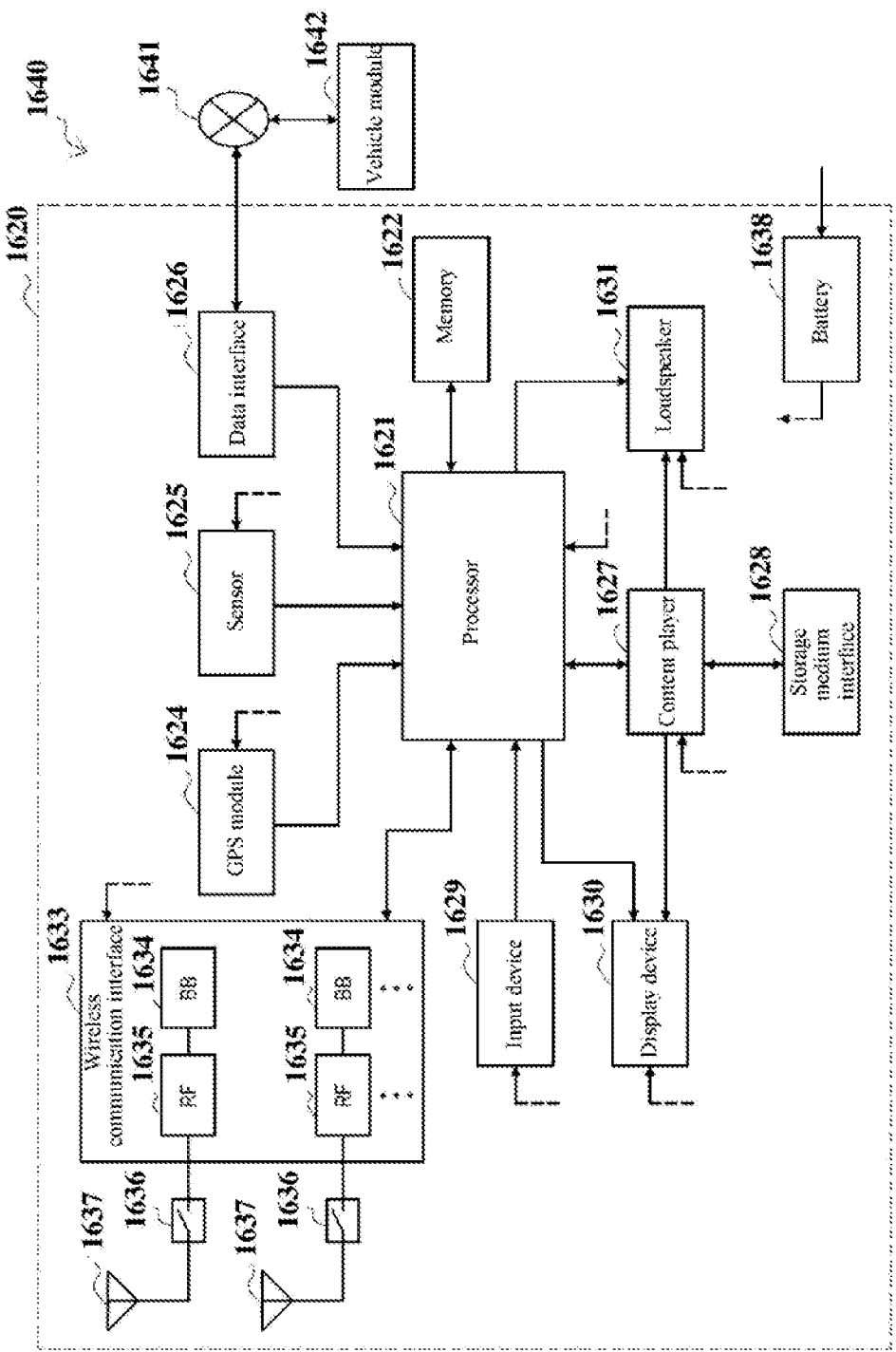
FIG. 16 is a block diagram showing an example of a schematic configuration of an automobile navigation device to which the present disclosure may be applied.

FIG. 16 is a block diagram showing a schematic configuration example of an automobile navigation device 1620 to which the technology according to the present disclosure may be applied. The car navigation device 1620 includes a processor 1621, a memory 1622, a global positioning system (GPS) module 1624, a sensor 1625, a data interface 1626, a content player 1627, a storage medium interface 1628, an input device 1629, a display device 1630, a speaker 1631, a wireless communication interface 1633, one or more antenna switches 1636, one or more antennas 1637, and a battery 1638.

The processor 1621 may be for example a CPU or a SoC, and controls a navigation function and other functions of the car navigation device 1620. The memory 1622 includes RAM and ROM, and stores a program executed by the processor 1621, and data.

The GPS module 1624 measures a location of the automobile navigation device 1620 (such as a latitude, a longitude and a height) using a GPS signal received from a GPS satellite. The sensor 1625 may include a group of sensors such as a gyroscope sensor, a geomagnetic sensor and an air pressure sensor. The data interface 1626 is connected to for example an on-board network 1641 via a terminal not shown, and acquires data generated by the vehicle (such as vehicle speed data).

The content player 1627 reproduces contents stored in a storage medium (such as CD and DVD) which is inserted into the storage medium interface 1628. The input device 1629 includes for example a touch sensor configured to detect touch on a screen of the display device 1630, a button or a switch, and receives an operation or information inputted by the user. The display device 1630 includes a screen such as a LCD or an OLED display, and displays an image of the navigation function or content that is reproduced. The speaker 1631 outputs a sound for a navigation function or the reproduced content.

The wireless communication interface 1633 supports any cellular communication scheme (such as LTE and LTE-advanced) and performs wireless communication. The wireless communication interface 1633 may include for example a BB processor 1634 and an RF circuit 1635. The BB processor 1634 may perform for example coding/decoding, modulation/demodulation and multiplexing/de-multiplexing, and perform various types of signal processes for wireless communication. The RF circuit 1635 may include a mixer, a filter and an amplifier for example, and transmits and receives a wireless signal via the antenna 1637, The wireless communication interface 1633 may be a chip module on which the BB processor 1634 and the RF circuit 1635 are integrated. The wireless communication interface 1633 may include multiple BB processors 1634 and multiple RF circuits 1635. Although FIG. 16 shows an example in which the wireless communication interface 1633 includes multiple BB processors 1634 and multiple RF circuits 1635, the wireless communication interface 1633 may include a single BB processor 1634 or a single RF circuit 1635.

Furthermore, in addition to a cellular communication scheme, the wireless communication interface 1633 may support another type of wireless communication scheme, such as a short-distance wireless communication scheme, a near field communication scheme and a wireless LAN scheme. In this case, for each of the wireless communication schemes, the wireless communication interface 1633 may include a BB processor 1634 and an RF circuit 1635.

Each of the antenna switches 1636 switches a connection destination of the antenna 1637 among multiple circuits included in the wireless communication interface 1633 (such as circuits for different wireless communication schemes).

Each of the antennas 1637 includes one or more antenna elements (such as multiple antenna elements included in a MIMO antenna) and is used by the wireless communication interface 1633 to transmit and receive a wireless signal. As shown in FIG. 16, the automobile navigation device 1620 may include multiple antennas 1637. Although FIG. 16 illustrates the example in which the car navigation device 1620 includes the multiple antennas 1637, the car navigation device 1620 may also include a single antenna 1637.

Furthermore, the car navigation device 1620 may include the antenna 1637 for each wireless communication scheme. In this case, the antenna switches 1636 may be omitted from the configuration of the car navigation device 1620.

The battery 1638 supplies power to blocks of the car navigation device 1620 illustrated in FIG. 16 via feeder lines that are partially shown as dashed lines in the drawing. The battery 1638 accumulates the power provided from the vehicle.

In the automobile navigation device 1620 shown in FIG. 16, the processing circuit 110 described with reference to FIG. 1 and the monitoring unit 111 and the SPS configuration determining unit 112 included in the processing circuit 110 and the processing circuit 110 described with reference to FIG. 3 and the monitoring unit 111, the SPS configuration determining unit 112 and the processing unit 113 included in the processing circuit 110 may be implemented by the processor 1621. In addition, the communication unit 120 described with reference to FIG. 1 and FIG. 3 may be implemented by the wireless communication interface 1633. At least a portion of the functions may be implemented by the processor 1621. For example, the processor 1621 may perform the functions of monitoring the resource corresponding to the SPS configuration and determining a reselection result of the SPS configuration by executing instructions stored in the memory 1622.

The technology of the present disclosure may be implemented as a vehicle system (or a vehicle) 1640 including one or more of the automobile navigation device 1620, a vehicle network 1641 and a vehicle module 1642. The vehicle module 1642 generates vehicle data (such as information on a vehicle speed, a motor speed and a fault), and outputs the generated data to the vehicle network 1641.

In the device and the method of the present disclosure, it is apparent that each unit or step can be decomposed and/or recombined. These decomposition and/or recombination shall be considered as equivalents of the present disclosure. In addition, steps in the series of processing described above may be performed naturally in an order of description and in a time order, and is not necessarily performed in the time order. Some steps may be performed in parallel or independently from each other.

Although the embodiments of the present disclosure have been described in detail in combination with the drawings above, it should be understood that, the embodiments described above are only used to explain the present disclosure and are not constructed as the limitation to the present disclosure. Those skilled in the art can make various modifications and variations onto the above embodiments without departing from the spirit and scope of the present disclosure. Therefore, the scope of the present disclosure is defined by only the appended claims and equivalent meaning thereof.

The invention claimed is:

1. An electronic device in a wireless communication system, comprising one or more processing circuits configured to perform operations of:
 monitoring a received signal strength on resources corresponding to a first semi-persistent scheduling (SPS) configuration used by the electronic device and a received signal strength on resources corresponding to other SPS configurations other than the first SPS configuration;
 reselecting a SPS configuration of the electronic device to one of the other SPS configurations based on a comparison of the received signal strength on the resources corresponding to the first SPS and the received signal strength on the resources corresponding to the other SPS configurations; and
 transmitting the reselected SPS configuration to a network side device for serving the electronic device.

2. The electronic device according to claim 1, wherein the reselecting comprises:
 reselecting the SPS configuration of the electronic device to the one of the other SPS configurations, in a case that the received signal strength on the resources corresponding to the first SPS configuration increases a predetermined rate of increase and the received signal strength on the resources corresponding to the one or more SPS configurations decreases at a predetermined rate of decrease.

3. The electronic device according to claim 1, wherein the processing circuit is further configured to perform an operation of:
 transmitting a service to the network side device based on the reselected SPS configuration.

4. The electronic device according to claim 1, wherein the reselecting comprises:
 reselecting the SPS configuration of the electronic device to the one of the other SPS configurations based on a link quality between the electronic device and the network side device for serving the electronic device, in a case that the received signal strength on the resources corresponding to the first SPS configuration increases at the predetermined rate of increase and there is no other SPS configuration of the other SPS configurations in which a received signal strength on corresponding resources decreases at the predetermined rate of decrease.

5. The electronic device according to claim 4, wherein the processing circuit is further configured to perform operations of:
 transmitting an SPS configuration reselection request to the network side device, in a case that the link quality between the electronic device and the network side device is less than a first threshold; and
 performing no SPS configuration reselection of the electronic device, in a case that the link quality between the electronic device and the network side device is greater than or equal to the first threshold.

6. The electronic device according to claim 1, wherein the processing circuit is further configured to perform an operation of:
 receiving the first SPS configuration from the network side device for serving the electronic device.

7. The electronic device according to claim 6, wherein the processing circuit is further configured to perform an operation of:
 transmitting, to the network side device, location information and speed information of the electronic device and priority information of a service transmitted to the network side device.

8. A network side device in a wireless communication system, comprising one or more processing circuits configured to perform operations of:
 receiving, from a first user side device within a serving range of the network side device, location information and speed information of the first user side device;
 configuring a first SPS configuration for the first user side device based on the location information and speed information;
 measuring resources corresponding to the first SPS configuration and resources corresponding to other SPS configurations other than the first SPS configuration;
 reselecting a SPS configuration of the electronic device to one of the other SPS configurations, in a case that a number of user side devices using the resources corresponding to the first SPS configuration in a predetermined range exceeds a second threshold; and
 transmitting the reselected SPS configuration to a network side device for serving the electronic device.

9. The network side device according to claim 8, wherein the processing circuit is further configured to perform operations of:
 predicting future location information of the first user side device in a predetermined time period based on the location information and speed information; and
 configuring the first SPS configuration for the first user side device based on the predicted future location information of the first user side device in the predetermined time period.

10. The network side device according to claim 9, wherein the processing circuit is further configured to perform operations of:
 predicting future location information of other user side devices other than the first user side device in the predetermined time period; and
 configuring the first SPS configuration for the first user side device based on the predicted future location information of the first user side device in the predetermined time period and the predicted future location information of the other user side devices in the predetermined time period.

11. The network side device according to claim 8, wherein the processing circuit is further configured to perform operations of:
 receiving, from the first user side device, priority information of a service transmitted from the first user side device to the network side device; and
 configuring the first SPS configuration for the first user side device based on the priority information.

12. The network side device according to claim 8, wherein the reselecting comprises:
 reselecting, in a case that the one of the other SPS configurations in which the number of user side devices is less than the second threshold, the first user side device from the first SPS configuration to the one of the other SPS configurations.

13. The network side device according to claim 12, wherein the one of the other SPS configurations has a same downlink control information (DCI) format as the first SPS configuration.

14. The network side device according to claim 12, wherein the reselecting comprises:

reselecting based on a priority information of a service transmitted from the first user side device to the network side device, in a case that none of the other SPS configurations in which the number of user side devices is less than the second threshold.

15. The network side device according to claim 14, wherein the processing circuit is further configured to perform operations of:
releasing an SPS progress of the first user side device in a case that the priority of the service transmitted from the first user side device to the network side device is less than a third threshold; and
performing no SPS configuration reselection of the first user side device in a case that the priority of the service transmitted from the first user side device to the network side device is greater than or equal to the third threshold.

16. The network side device according to claim 8, wherein the processing circuit is further configured to perform an operation of:

receiving an SPS configuration reselection request from the first user side device.

17. A method performed by an electronic device in a wireless communication system, comprising:
monitoring a received signal strength on resources corresponding to a first semi-persistent scheduling (SPS) configuration used by the electronic device and a received signal strength on resources corresponding to other SPS configurations other than the first SPS configuration; and
reselecting a SPS configuration of the electronic device to one of the other SPS configurations based on a comparison of the received signal strength on the resources corresponding to the first SPS and the received signal strength on the resources corresponding to the other SPS configurations; and
transmitting the reselected SPS configuration to a network side device for serving the electronic device.

* * * * *